(12) United States Patent
Higashiyama et al.

(10) Patent No.: US 7,339,888 B2
(45) Date of Patent: Mar. 4, 2008

(54) BRIDGE AND ROUTE CHANGE METHOD OF NETWORK USING THE SAME

(75) Inventors: Mitsuru Higashiyama, Atsugi (JP); Shoji Ishii, Atsugi (JP); Atsushi Saegusa, Atsugi (JP); Seiichi Sawada, Atsugi (JP)

(73) Assignee: Anritsu Corporation, Tokyo (JP)

( * ) Notice: Subject to any disclaimer, the term of this patent is extended or adjusted under 35 U.S.C. 154(b) by 939 days.

(21) Appl. No.: 10/439,894

(22) Filed: May 16, 2003

(65) Prior Publication Data

US 2004/0017770 A1    Jan. 29, 2004

(30) Foreign Application Priority Data

May 23, 2002    (JP) .............................. 2002-149489

(51) Int. Cl.
*H04L 12/437*    (2006.01)
(52) U.S. Cl. ...................................... 370/223; 370/401
(58) Field of Classification Search ................ 370/401, 370/389, 402, 404, 410, 223, 400, 254, 255, 370/256, 258, 216, 221, 222, 224, 225
See application file for complete search history.

(56) References Cited

U.S. PATENT DOCUMENTS

| | | | | |
|---|---|---|---|---|
| 5,150,360 | A | * | 9/1992 | Perlman et al. ............. 370/402 |
| 5,220,562 | A | * | 6/1993 | Takada et al. .............. 370/404 |
| 5,844,902 | A | * | 12/1998 | Perlman ...................... 370/401 |
| 6,363,068 | B1 | * | 3/2002 | Kinoshita ................... 370/389 |
| 6,765,881 | B1 | * | 7/2004 | Rajakarunanayake ....... 370/256 |
| 2001/0021177 | A1 | * | 9/2001 | Ishii ........................... 370/256 |
| 2002/0087719 | A1 | * | 7/2002 | Katoh et al. ................ 709/237 |
| 2004/0081083 | A1 | * | 4/2004 | Sekihata ..................... 370/222 |

OTHER PUBLICATIONS

ANSI/IEEE Std 802.1D, 1998 Edition, Part 3: Media Access Control (MAC) Bridges.*
ANSI/IEEE Srd 802.1D, 1998 Edition, Part 3: Media Access Control (MAC) Bridges, title page, pp. iv-xix; and pp. 58-113.

* cited by examiner

*Primary Examiner*—Ricky Q. Ngo
*Assistant Examiner*—Ankit P Gandhi
(74) *Attorney, Agent, or Firm*—Frishauf, Holtz, Goodman & Chick, P.C.

(57) ABSTRACT

A plurality of bridges are interconnected between respective ports thereof in a ring shape to configure a network containing a redundant route. When a bridge has a blocking port, the bridge transmits to the network a blocking advertisement containing information indicating that it has a blocking port and its address. When a bridge does not have a blocking port, the bridge transmits a line failure notification to other bridges having a blocking port when a line failure is sensed. When a bridge has a blocking port and the line failure notification has been received from other bridges, the bridge transmits to the network a blocking release advertisement indicating that the blocking port has been transited to a forwarding state and the blocking state has been released. When a bridge receives a blocking release advertisement packet, the bridge erases a forwarding database thereof.

16 Claims, 12 Drawing Sheets

| | | | | | | | | | |
|---|---|---|---|---|---|---|---|---|---|
| DMAC = FF-FF-FF-FF-FF-FF | | | | | | | | | |
| SMAC = 00-00-91-00-10-20 | | | | | | | | | |
| Type = 0800(IP) | | | | | | | | | |
| Ver | HLEN | TOS | Total length | | | | | | |
| Identifier (ID) | | | Flag | Fragment offset | | | | | |
| Time to Live | | Prot = UDP | Header checksum | | | | | | |
| SIP = 192.168.1.2 | | | | | | | | | |
| DIP = 192.168.1.255 | | | | | | | | | |
| SP = 1234 | | | | DP = 3000 | | | | | |
| LEN = 20 | | | | Checksum | | | | | |
| Flag = Blocking | | | | | | | | | |
| 00-00-91-00-10-20 | | | | | | | | | |
| 192.168.1.2 | | | | | | | | | |

FIG. 2

| | |
|---|---|
| DMAC = FF-FF-FF-FF-FF-FF | |
| SMAC = 00-00-91-00-10-20 | |
| Type = 0800 (IP) | |
| Ver | HLEN | TOS | Total length |
| Identifier (ID) | Flag | Fragment offset |
| Time to Live | Prot = UDP | Header checksum |
| SIP = 192.168.1.2 | |
| DIP = 192.168.1.255 | |
| SP = 1234 | DP = 3000 |
| LEN = 20 | Checksum |
| Flag = Non-blocking | |
| 00-00-91-00-10-20 | |
| 192.168.1.2 | |

FIG. 3

BRIDGE AND ROUTE CHANGE METHOD OF NETWORK USING THE SAME

CROSS-REFERENCE TO RELATED APPLICATIONS

This application is based upon and claims the benefit of priority from the prior Japanese Patent Application No. 2002-149489, filed May 23, 2002, the entire contents of which are incorporated herein by reference.

BACKGROUND OF THE INVENTION

1. Field of the Invention

The present invention relates to a bridge for use in a network containing a redundant route caused by a plurality of bridges and a route change method of the network using the same.

2. Description of the Related Art

In a network containing a redundant route caused by a plurality of bridges, a spanning tree protocol is employed for determining a route.

For example, as shown in FIG. 15, assume a network over which LAN 1 and LAN 2 are connected to each other by means of a bridge A.

Here, in the case of a network over which node "n1" such as personal computer is connected to LAN 1, and HUB 1 is connected to LAN 2, packets transmitted from the node "n1" are transmitted to all nodes of a broadcast domain including node "n2" such as personal computer connected to the HUB 1 via LAN 1→bridge A→LAN 2→HUB 1.

Over such network, when HUB 2 is connected to LAN 1 and LAN 2 in parallel to bridge A, a packet transmitted from the node "n1" loops over the network like LAN 1→bridge A→LAN 2→HUB 2→LAN 1→bridge A→LAN 2→HUB 2. As a result, a packet cannot be transmitted from a node other than node "n1" (node in a broadcast domain other than node "n1").

In the case where a network is configured by only bridge A and HUB 1 as shown in FIG. 15, a spanning tree is employed to prevent a packet transmitted from a node from looping over the network.

In addition, as shown in FIG. 16, in the case where two bridges A and B are connected in parallel between LAN 1 to which node "n1" such as personal computer is connected and LAN 2 to which HUB 1 is connected, thereby making communication among nodes "n2", "n3", "n4", . . . such as personal computers connected to node "n1" and HUB 1, one bridge is generally used to make communication. When this bridge A is linked down, the other bridges B is used to make communication, whereby a spanning tree is employed in order to cause a network to provide redundancy.

Here, basic algorithm and protocol of the spanning tree consists of the following items (1) to (5) (Refer to ISO/IEC 15802-3; 1998 (E) ANSI/IEEE Std 802. 1D, 1998 Edition, Part 3: Media Access Control (MAC) Bridges, pp v-xix, LOCAL AND METROPOLITAN AREA NETWORKS: 8. The Spanning Tree Algorithm and Protocol pp. 58-109 and 9. Encoding of Bridge Protocol Data Units (BPDUs) pp. 110-113).

(1) A special frame called Configuration Bridge Protocol Data Units (hereinafter, referred to as BPDU) is exchanged between bridges.

The following works are performed based on this exchanged BPDU.

(2) A network root bridge is selected.

Only one root bridge exists in the entire LAN bridge connected.

(3) Each bridge computes the shortest route that reaches a root bridge (A port that provides the shortest route to the root bridge is called a root port).

(4) With respect to each LAN, a "designated bridge" is selected from a bridge connected to the LAN.

(5) Each bridge selects a port (designated port) that belongs to a spanning tree and a port (blocking port) that does not belong to such spanning tree.

All data frames received at a blocking port are discarded. In addition, frame transmission from a blocking port is not performed at all.

A received BPDU is not forwarded at all.

A data portion of the above mentioned BPDU includes at least root ID, bridge ID, root path cost.

Root ID is an ID of a root bridge (or a bridge assumed to be such root bridge), and is generated based on a MAC address of such bridge and a priority designated by an administrator.

Bridge ID is an ID of a bridge that transmits a BPDU, and is generated based on a MAC address of such bridge and a priority designated by an administrator.

A root path cost is a cost of the (possible) shortest route from a bridge that transmits a BPDU to a root bridge.

In an initial state (when a power is supplied), each bridge is a root bridge itself, and it is assumed that a root path cost is 0.

Each bridge transmits the initial value of a BPDU to all ports, and at the same time, receives the BPDU transmitted from another bridge from all the ports.

In the case where a bridge has received a better BPDU from a port, such bridge stops transmission of BPDU to that port, and then, changes the value of the BPDU to be transmitted by its own bridge.

In this manner, in the case where a spanning tree enters a stable state, only one bridge transmits a BPDU among each LAN.

For example, in the case where BPDU 1 and BPDU 2 are present, it is judged which of the above BPDUs is better in accordance with rules (1) to (4) below.

(1) In the case where root ID of BPDU 1 is numerically smaller than that of BPDU 2, it is judged that BPDU 1 is better than BPDU 2.

(2) In the case where root ID of BPDU 1 is numerically equal to that of BPDU 2, if a root path cost of BPDU 1 is smaller than that of BPDU 2, it is judged that BPDU 1 is better than BPDU 2.

(3) In the case where root ID of BPDU 1 is numerically equal to that of BPDU 2, and a root path cost of BPDU 1 is equal to that of BPDU 2, if bridge ID of BPDU 1 is numerically smaller than that of BPDU 2, it is judged that BPDU 1 is better than BPDU 2.

(4) In the case where root ID of BPDU 1 is numerically equal to that of BPDU 2, a root path cost of BPDU 1 is equal to that of BPDU 2, and bridge ID of BPDU 1 is numerically equal to that of BPDU 2, if port ID of BPDU 1 is smaller than that of BPDU 2, it is judged that BPDU 1 is better than BPDU 2.

Then, each bridge compares the initial value of its own BPDU with that of the BPDU from another bridge received from all ports, and selects root ID from the best BPDU.

Next, each bridge computes its own root path cost in accordance with (root path cost)=(root path cost in the best BPDU)+path cost.

A path cost is a cost to the root that each port individually has, and the value of the cost can be set by an administrator.

Once a root ID, a route port, and a root path cost are defined, each bridge updates the content of BPDU transmitted by such each bridge itself.

Further, its own updated BPDU is compared with BPDU received from a port other than root port, and it is judged whether or not each port other than root port is a designated bridge itself.

A port that is a designated bridge is called a designated port, and a port that is not a designated bridge is called a blocking port.

In BPDU transmission and data frame forwarding to a root port, a designated port and a blocking port, a data frame is forwarded at the root port without transmitting BPDU; BPDU is transmitted, and a data frame is forwarded at the designated port; and BPDU is not transmitted, and a data frame is not forwarded at the blocking port.

In this manner, once a spanning tree is configured, each bridge performs regular operations described in (1) to (4) below.

These regular operations are required for reconfiguring a spanning tree that has been configured due to a bridge fault or addition of new bridge.

(1) BPDU includes an element called "message age".

This value denotes an elapsed time after a root bridge has generated a BPDU that corresponds to the above BPDU.

(2) A root bridge transmits its own BPDU periodically to all ports. At this time, "message age" is set to 0.

(3) Each bridge stores a received BPDU, and increases the value of the "message age" of the BPDU stored in each port with an elapse of time (message age timer).

(4) A bridge other than root bridge transmits its own BPDU when it receives a BPDU from a root port.

At this time, as a value of the "message age", there is used a value equal to or greater than the "message age" of the root port and greater than the "message age" of the received BPDU.

Here, the reconfiguration of the spanning tree occurs in any of the cases described in (1) and (2) below.

(1) In the case where the "message age" timer of the stored BPDU times out (in the case where a max age is exceeded); or (2) In the case where a BUDU better than that stored in a port is received from the same port.

In the case where any of the above events occurs, a bridge performs re-computation for a root ID, a root cost, and a root port.

In the meantime, it is very dangerous to perform data frame transmission before all the bridges over a network enters a normal state after configuration (reconfiguration) of a spanning tree has been started.

This is because there is a possibility that a temporary loop occurs during spanning tree configuration. Therefore, even if each bridge determines its own designated port, it does not start data frame forwarding immediately.

There are three types of the states of each port in a bridge:

(1) listening: No work concerning a data frame is carried out.

(2) learning: Although the learning of a source MAC address is performed, forwarding is not performed.

(3) forwarding: Data frame forwarding is performed.

The lengths of the listening state and learning state are called a "forward delay". A root bridge determines its value, enters its value in a BPDU, and transmits the fact to each bridge.

In addition, a timer employed in the listening state and learning state is called a "forwarding timer".

If spanning tree reconfiguration occurs, a host position changes, and the contents of an old learning table may be incorrect.

Thus, the bridge corresponding to a spanning tree has two kinds of states as timeout values of the learning table aging timer as follows.

(1) Normal value: This value is set to a long time such as a few minutes.

(2) A value used after topology change: This value is the same as the forward delay value.

When a bridge senses spanning tree reconfiguration, the timeout value of the learning table aging timer is set to a value identical to forward delay for a predetermined period of time.

In the meantime, a spanning tree algorithm and protocol has a system that notifies to all bridges that spanning tree reconfiguration has occurred.

(1) When a bridge senses a topology change, that bridge transmits a frame called TCN-BPDU (Topology Change Notification BPDU) to a root port with hello time intervals.

This transmission is continued until a BPDU in which a TCA (Topology Change Acknowledgment) flag is set has been received from the root port.

(2) A bridge which has received TCN-BPDU also transmits TCN-BPDU to its own root port.

On the other hand, to a port that has received a TCN-BPDU, a BPDU TCA flag is set, and a BPDU is transmitted during transmission of the next BPDU.

(3) In the case where a root bridge receives a TCN-BPDU or the state of its own port changes, the root bridge transmits a BPDU in which a TC (Topology Change) flag is set from that time to a max age+forward delay time.

(4) A bridge which has received the TC flag set BPDU from a root port sets a TC flag for its own BPDU, and transmits such BPDU. This transmission is continued until a BPDU in which a TC flag is not set has been received.

(5) While a bridge receives TC flag set BPDU from the root port, the bridge uses the value of "forward delay" as a timeout value of the learning table aging timer.

In this way, a spanning tree has an algorithm for automatically removing a loop in a redundant bridge network, and automatically sensing a network topology change caused by a device fault or cable failure, thereby automatically changing a network topology so as to prevent a loop from being produced.

In the meantime, such spanning tree works so as not to form a loop in a network. However, in the case where a root port is linked down for any reason (such as cable reconnection, invalid port setting or communication route change caused by a communication failure, for example), an operation for restoring a blocking port that has stopped and reconfiguring a spanning tree is executed.

FIG. 17 shows an example of a network describing such operation.

In the network shown in FIG. 17, assume that three bridges A, B and C are connected to each other, and a spanning tree is configured so that, in a normal state, communication can be made when bridge A is defined as a root bridge, bridge B is defined as a representative bridge, and a port of bridge C oriented to the bridge B is defined as a blocking port.

With respect to the nodes connected to each bridge, only portions required for illustration is illustrated, and the other portion is omitted.

In the network shown in FIG. 17, in the case of making communication between node "n1" connected to bridge B and node "n2" connected to bridge C, a signal from the node "n1" of bridge B is transmitted to node "n2" of bridge C through bridges A and C.

If communication is disabled between bridges A and B for any reason, communication between node "n1" connected to bridge B and node "n2" connected to bridge C is also disabled. Thus, it is required to open a blocking port of bridge C, and change a communication route, thereby reconfiguring a spanning tree.

In a conventional spanning tree, if communication is disabled between bridges A and B, bridge B does not receive a BPDU periodically transmitted from bridge A that is a root bridge. In this manner, when bridge B does not receive the BPDU for a predetermined time, bridge B detects a network failure relevant to bridge A.

When bridge B detects a network failure, a BPDU is not transmitted from bridge B to bridge C.

In this manner, bridge C does not receive a BPDU essentially transmitted via bridges A and B.

When bridge C starts an operation for gradually opening a blocking port so as to enable communication between bridges B and C after an elapsed time from a time when a BPDU is not received from bridge B has elapsed a predetermined designated time.

When a blocking port of bridge C fully opens, communication between a node connected bridge B and a node connected to bridge C is enabled.

In this manner, in the network by bridges, as an algorithm and a protocol standardized for employing a redundant configuration, there is known ANSI/IEEE 802. 1D, 1998 Edition, 8. Spanning Tree Algorithm and Protocol pp. 58-109 and 9. Encoding of Bridge Protocol Data Units (BPDUs) pp. 110-113 as described above.

In this IEEE 802. 1D, 1998 Edition, 8. Spanning Tree Algorithm and Protocol pp. 58-109 and 9. Encoding of Bridge Protocol Data Units (BPDUs) pp. 110-113, a route change operation is performed after at least 6 seconds of the period when BPDU has not been received from a representative port due to a route failure.

Thus, during real-time communication or the like, a communication disable time occurs for 14 second in total including the above 6 seconds and twice forward delay times (at least 4 seconds).

For example, when a video or the like is distributed, the video is interrupted for this communication disable time so that the accurate video cannot be distributed for the time.

Further, when a plurality of bridges using this algorithm and protocol are connected to each other, thereby configure a network, up to 7 bridges can be connected to each other and more than 7 bridges cannot be connected to each other to configure the network.

The inventors etc. of the present application have already disclosed the invention relating to "spanning tree bridge and route change method thereof" for fast reconfiguration in U.S. Pat. Appln. Publication No. US2001/0021177A1 (filing date Mar. 5, 2001) in order to eliminate the above problem.

When a link down is sensed at a root port, the bridge disclosed in this U.S. Pat. Appln. Publication No. US2001/0021177A1 performs topology sensing processing and enters a root bridge like when an effective period of time of a BPDU has lapsed, that is at the time when the max age timer comes through.

Also when a BPDU having root bridge information inferior to root bridge information held by a reception port has been received from a representative bridge, the bridge performs the topology change sensing processing and enters a root bridge like when the max age timer comes through.

Thus, when the bridge has entered a root bridge, a port which has been essentially a blocking port is immediately transited to a forwarding state.

A bridge which has received TCN-BPDU immediately propagates TCN-BPDU regardless of hold time.

When the bridge is a root bridge, the bridge immediately transmits a BPDU in which a TC sensing flag is set to all the ports.

The bridge which has received a BPDU in which a TC sensing flag is set immediately transmits a BPDU regardless of hold time, and immediately after, deletes database information of a forwarding table.

Therefore, according to the configuration disclosed in U.S. Pat. Appln. Publication No. US2001/0021177A1, in the network containing a redundant route caused by a plurality of bridges, it is possible to handle cable reconnection, invalid port setting, or communication route change due to a communication failure, and promote a return from communication interruption thereby reducing route change time.

However, also in the configuration disclosed in U.S. Pat. Appln. Publication No. US2001/0021177A1 described above, there are problems described later.

As shown in FIG. 18, a case where a plurality of bridges 11 are connected to each other in multi-stages in a ring shape so that a network 13 is configured will be considered.

Here, in order to simplify the description, as shown in FIG. 18, there will be described a configuration example of the network 13 where twelve bridges 11 (A to L) are connected to each other between ports 12 in a ring shape, a node 14 (X) is connected to a bridge A and a node 14 (Y) is connected to a bridge H.

Here, assume that bridge A is a root bridge, connecting ports 12 (12g) of bridges G and F are in a blocking state.

In this case, a packet from the node X to the node Y reaches the node Y through the bridges A→L→K→J→I→H.

Now, when a failure is present in the route between the bridges A and L, according to the configuration disclosed in U.S. Pat. Appln. Publication No. US2001/0021177A1, the bridge L enters a root bridge to transmit a BPDU to the bridge K.

Then, the bridge K performs port cost addition of a BPDU to the bridge J and transmits the same. Further, a BPDU in which port cost addition has been performed is transmitted from the bridge J to the bridge I.

After a BPDU has been received from the previous bridge and port cost addition processing has been performed, when an operation of transmitting a BPDU to the next bridge is repeated and the BPDU has finally reached the bridge G, the bridge G transits the port 12g from a blocking state to a forwarding state.

Thus, a packet from the node X to the node Y is enabled to reach through a new route of the bridges A→B→C→D→E→F→G→H.

At this time, a BPDU from the bridge K is routed through four bridges until the BPDU reaches the bridge G. Thus, assume that a time from the time when one bridge has received a BPDU and recounted the cost to a time when the bridge has output it to another port is set to, for example, 10 msec, 50 msec in total is required.

In the example shown in FIG. 18, the BPDU from the bridge K routes through four bridges until the BPDU bridge K reaches the bridge G. But, for example, in the case of a network configuration where 49 bridges are routed through, 500 msec is required.

Therefore, in the configuration disclosed in such U.S. Pat. Appln. Publication No. US2001/0021177A1, the more the number of bridges increases according to the network configuration, the more the time is required for the route change, and there occurs a problem that lowering of communication efficiency is caused.

Next, the case where a network is configured and a new loop is configured in the network will be considered.

Here, in FIG. 19, there will be described a case where the bridges K and L are connected to each other and a new loop is configured. Also in this case, a root bridge is assumed to be the bridge A like the aforementioned case.

When the bridge K is connected to the bridge J, it enters the port 12 (12k) into a listening state, and starts to transmit a BPDU toward the bridge J. The BPDU which the bridge J has received reaches the bridge G through the bridges I and H.

Here, the bridge G has a port having the highest cost from the bridge A so that the connecting port 12g with the bridge F is immediately entered into a blocking port.

There is a problem that, even when the bridge G has entered the port 12g into a blocking port, the port 12k of the bridge K and the port 12j of the bridge J remain in a listening state.

Therefore, a packet delivery is interrupted in the route of the bridges J, I, and H. The bridge J enters the port 12j into a learning state after a forwarding delay timer has lapsed (for example, 15 seconds in default has been lapsed), and further enters the port 12j into a forwarding state after a forward delay timer has lapsed.

Thus, the packet delivery starts 30 seconds after a loop has been configured. In other words, there is a problem that the packet delivery is delayed for the time of the forwarding delay timer.

In this manner, in the network configuration having a redundant route using conventional bridges, a time is required after a link down at the time of starting up of the network and line failure occurrence has been sensed until blocking ports are opened so that communication between nodes connected to bridges is enabled. Further, a time until communication starts and a time until communication interruption is eliminated are slow, thereby causing lowering of communication efficiency.

BRIEF SUMMARY OF THE INVENTION

It is an object of the present invention to provide a bridge and a route change method of a network using the same, which can reduce a time until communication starts and a time until communication interruption is eliminated, thereby improving communication efficiency even when a communication route is started up and a communication route is changed.

In order to achieve the above object, according to a first aspect of the present invention, there is provided a bridge for use in a network containing a redundant route where a plurality of bridges containing an own bridge and other bridges are connected to each other between respective ports thereof in a ring shape, comprising:

a blocking advertisement transmitting/receiving function section (115) which, when the own bridge has a blocking port, transmits a blocking advertisement packet containing an address of the own bridge which indicates that a port of the own bridge has been transited to a blocking state to the network by a broadcast packet or multicast packet, and receives a blocking advertisement packet from the other bridges;

a line failure sensing function section (112) which senses a failure of a line connected to the port of the own bridge;

a failure occurrence notification transmitting/receiving function section (114) which, when a failure of the line connected to the port of the own bridge is sensed by the line failure sensing function section, if the port of the own bridge is not the blocking port, transmits a line failure notification for transiting a blocking port to a forwarding state to the other bridges having the blocking port by any of a unicast packet, a broadcast packet, and a multicast packet and receives a line failure notification from the other bridges;

a blocking release transmitting/receiving function section (116) which, when the own bridge has a blocking port and the line failure notification is received from the other bridges by the failure occurrence notification transmitting/receiving function section, transmits a blocking release advertisement packet indicating that the blocking port has been transited to a forwarding state and the blocking state has been released, to the network by a broadcast packet or multicast packet, and receives a blocking release advertisement packet from the other bridges; and a forwarding database erasing function section (118) which, when the blocking release advertisement packet from the other bridges is received by the blocking release transmitting/receiving function section, erases a forwarding database of the own bridge.

In order to achieve the above object, according to a second aspect of the present invention, there is provided a bridge according to the first aspect, wherein, when a loop is generated in the network and the port of the own bridge is entered into a blocking port, the blocking advertisement transmitting/receiving function section has a function of transmitting a blocking advertisement packet containing an address of the own bridge which indicates that the port of the own bridge has been transited to a blocking state, to the network by a broadcast packet or multicast packet, and receiving a blocking advertisement packet from the other bridges, and the bridge further comprises a port state transiting function section (111) which, when the blocking advertisement packet from the other bridges is received by the blocking advertisement transmitting/receiving function section, if the own bridge has a port of listening or learning state, immediately transits the port to a forwarding state.

In order to achieve the above object, according to a third aspect of the present invention, there is provided a bridge according to the first aspect, further comprising:

an address storage function section (117) which stores addresses of the other bridges to which the blocking advertisement packet is to be transmitted by the blocking advertisement transmitting/receiving function section, wherein, when the failure occurrence notification transmitting/receiving function section transmits the line failure notification by the unicast packet, the line failure notification is transmitted to the other bridges having the addresses stored in the address storage function section.

In order to achieve the above object, according to a fourth aspect of the present invention, there is provided a bridge for used in a network containing a redundant route where a plurality of bridges containing an own bridge and other bridges are connected to each other between respective ports thereof in a ring shape, comprising:

a blocking advertisement transmitting/receiving function section (115) which, when a loop is generated in the network and a port of the own bridge is entered into a blocking port, transmits a blocking advertisement packet containing an address of the own bridge which indicates that the port of the own bridge is transited into a blocking state, to the network by a broadcast packet or multicast packet, and receives a blocking advertisement packet from the other bridges; and a port state transiting function section (111) which, when the blocking advertisement packet from the other bridges is received by the blocking advertisement transmitting/receiving function section, immediately transits the port into a forwarding state when the own bridge has a listening or learning port.

In order to achieve the above object, according to a fifth aspect of the present invention, there is provided a bridge according to the fourth aspect, further comprising:

a failure occurrence notification transmitting/receiving function section (114) which, when a line failure is sensed, if the own bridge does not have the blocking port, transmits a line failure notification for transiting a blocking port into a forwarding state, to the other bridges having the blocking port by any of a unicast packet, a broadcast packet, and a multicast packet, and receives a line failure notification from the other bridges; and an address storage function section (117) which stores addresses of the other bridges to which the blocking advertisement packet is to be transmitted by the blocking advertisement transmitting/receiving function section (115), wherein, when the failure occurrence notification transmitting/receiving function section (114) transmits the line failure notification by the unicast packet, the line failure notification is transmitted to the other bridges having the addresses stored in the address storage function section (117).

In order to achieve the above object, according to a sixth aspect of the present invention, there is provided a route change method of a network containing a redundant route where a plurality of bridges containing an own bridge and other bridges are connected to each other between respective ports in a ring shape, comprising:

when the own bridge has a blocking port, transmitting a blocking advertisement packet containing an address of the own bridge which indicates that a port of the own bridge has been transited to a blocking state, to the network by a broadcast packet or multicast packet;

when a line failure is sensed, if the own bridge does not have the blocking port, transmitting a line failure notification for transiting a blocking port to a forwarding state to the other bridges having the blocking port by any of a unicast packet, a broadcast packet, and a multicast packet;

when the own bridge has the blocking port and has received the line failure notification from the other bridges, transmitting a blocking release advertisement packet which indicates that the blocking port has been transited to a forwarding state and the blocking state has been released, to the network by a broadcast packet or multicast packet; and when the blocking release advertisement packet from the other bridges has been received, erasing a forwarding database of the own bridge.

In order to achieve the above object, according to a seventh aspect of the present invention, there is provided a route change method of a network according to the sixth aspect, further comprising:

when a loop is generated in the network and the port of the own bridge is entered into the blocking port, transmitting a blocking advertisement packet containing an address of the own bridge which indicates that the port of the own bridge has been transited to a blocking state, to the network by a broadcast packet or multicast packet; and when the blocking advertisement packet from the other bridges has been received, immediately transiting the port to a forwarding state if the own bridge has a listening or learning port.

In order to achieve the above object, according to an eighth aspect of the present invention, there is provided a route change method of a network according to the sixth aspect, further comprising:

when a line failure is sensed, if the own bridge does not have the blocking port, transmitting a line failure notification for transiting a blocking port to a forwarding state to the other bridges having the blocking port by any of a unicast packet, a broadcast packet, and a multicast packet; and storing addresses of the other bridges to which the blocking advertisement packet is to be transmitted, in a memory of the own bridge, wherein, when the line failure notification is transmitted by the unicast packet, the line failure notification is transmitted to the other bridges having the addresses stored in the memory of the own bridge.

In order to achieve the above object, according to a ninth aspect of the present invention, there is provided a route change method of a network containing a redundant route where a plurality of bridges containing an own bridge and other bridges are connected to each other between respective ports thereof in a ring shape, comprising:

when a loop is generated in the network and a port of the own bridge is entered into a blocking port, transmitting a blocking advertisement packet containing an address of the own bridge which indicates that the port of the own bridge has been transited to a blocking state to the network by a broadcast packet or multicast packet; and when the blocking advertisement packet from the other bridges has been received, if the own bridge has a port of listening or learning state, immediately transiting the port to a forwarding state.

In order to achieve the above object, according to a tenth aspect of the present invention, there is provided a route change method of a network according to the ninth aspect, further comprising:

when a line failure is sensed, if the own bridge does not have the blocking port, transmitting a line failure notification for transiting a blocking port to a forwarding state to the other bridges having the blocking port by any of a unicast packet, a broadcast packet, and a multicast packet; and storing addresses of the other bridges to which the blocking advertisement packet it to be transmitted, in a memory of the own bridge, wherein, when the line failure notification is transmitted by the unicast packet, the line failure notification is transmitted to the other bridges having the addresses stored in the memory of the own bridge.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 2 is a diagram showing one example of a packet format of a blocking advertisement transmitted to another bridge when a blocking port is held in the bridge in FIG. 1;

FIG. 3 is a diagram showing one example of a packet format of a blocking release advertisement transmitted to another bridge when a blocking port is entered into a forwarding state in the bridge in FIG. 1;

DETAILED DESCRIPTION OF THE INVENTION

Figure 1:
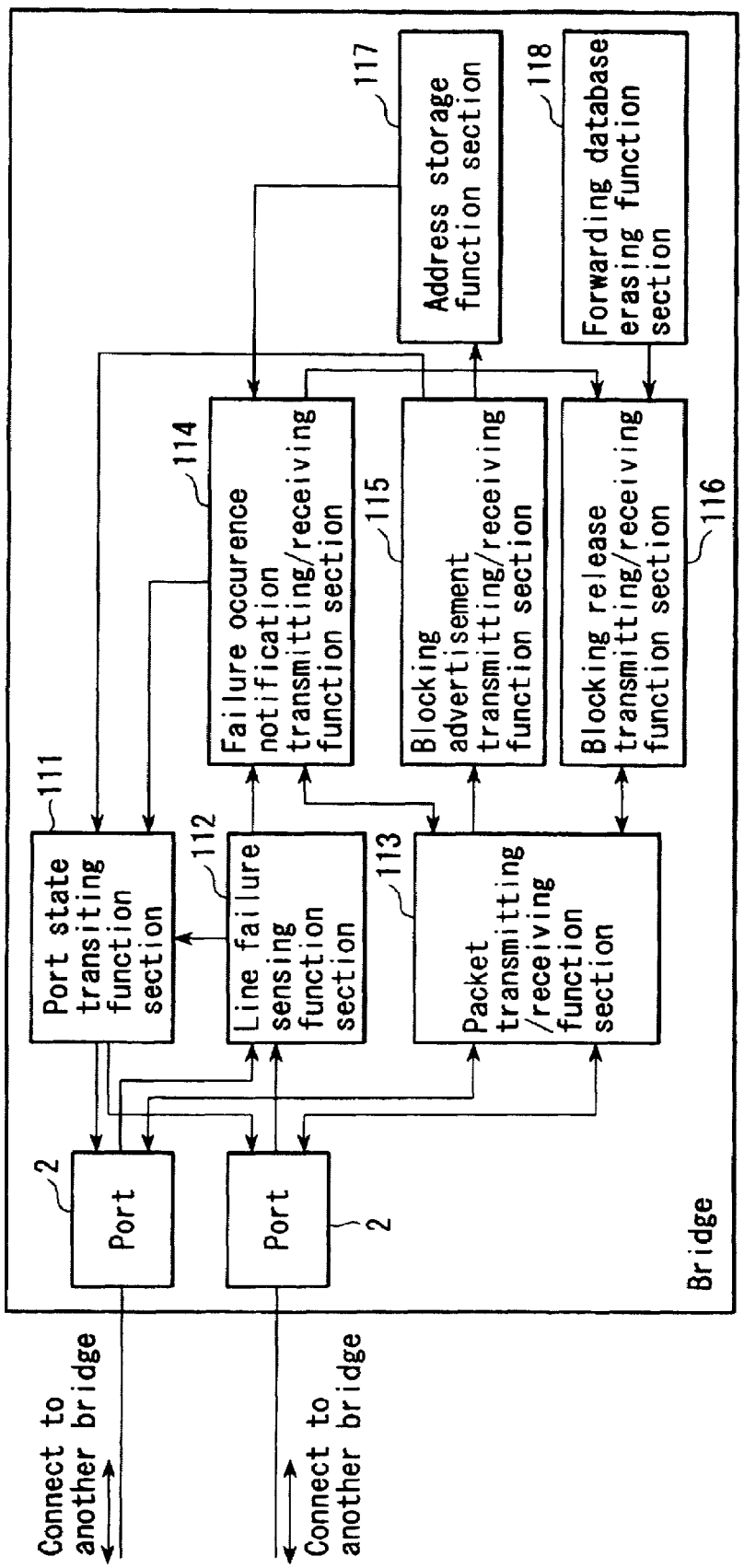
FIG. 1 is a block diagram showing a schematic configuration of an internal function of a bridge according to one embodiment of the present invention.

Reference will now be made in detail to the presently preferred embodiments of the invention as illustrated in the accompanying drawings, in which like reference numerals designate like or corresponding parts.

First, an outline of the present invention will be described. A bridge disclosed in the aforementioned U.S. Pat. Appln. Publication No. US2001/0021177A1 and a route change method using the same utilize a function (topology change sensing function, TCN-BPDU transmitting/receiving function, or the like) which a spanning tree protocol has, so that the spanning tree protocol is required to mount.

However, since a bridge and a route change method using the same according to the present invention can be applied to other than the spanning tree protocol, the spanning tree protocol is not required to mount.

Namely, the bridge and the route change method using the same according to the present invention are applied to a network having any system for sensing a loop generation and determining a blocking port.

In the following description, examples associated with a spanning tree protocol will be used conveniently.

FIG. 1 is a block diagram showing an outline of an internal function of a bridge according to one embodiment of the present invention.

As shown in FIG. 1, a bridge 1 according to this embodiment has a plurality of ports 2 (two ports in the example in FIG. 1) connected to other bridges.

Figure 9:
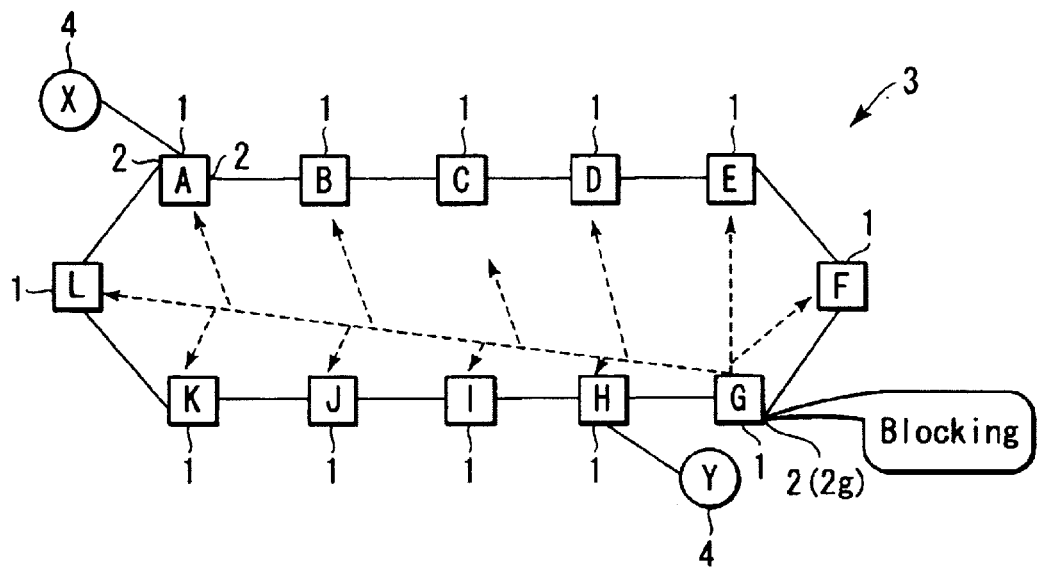
FIG. 9 is a diagram for explaining an operation when a line failure occurs between bridges in a network using the bridge in FIG. 1.

For example, as shown in FIG. 9, a plurality of bridges 1 (A to L) having the same function are connected to each other through the ports 2 thereof in a ring shape.

Further, for example, a plurality of nodes 4 such as personal computers are connected to the bridges 1 as LAN according to the network form.

FIG. 9 shows an example where a node X is connected to a bridge A and a node Y is connected to a bridge H as the plurality of nodes 4.

Thus, a network 3 containing a redundant route caused by the plurality of bridges 1 including an own bridge 1 and other bridges 1 is configured.

Note that the bridges 1 according to this example can be also employed to the case where a plurality of bridges are further connected to each other in a ring shape with one bridge as starting point, thereby configuring a network.

As shown in FIG. 1, each bridge 1 according to this example immediately performs a route change when a line failure occurs, and comprises unique function sections such as a port state transiting function section 111, a line failure sensing function section 112, a packet transmitting/receiving function section 113, a failure occurrence notification transmitting/receiving function section 114, a blocking advertisement transmitting/receiving function section 115, a blocking release transmitting/receiving function section 116, an address storage function section 117, a forwarding database erasing function section 118 in order to promote a return from communication interruption thereby improving communication efficiency.

Here, the line failure sensing function section 112 has a function of sensing a line failure by information on a directional port (route port) oriented to a route bridge (bridge A in the example in FIG. 9).

With further description, as shown in FIG. 9, when the ports 2 of each bridge 1 are connected, they are in a conductive state.

The line failure sensing function section 112 senses a line failure by an interruption signal which generates when connection between the ports 2 of each bridge 1 is dropped.

This line failure can be sensed by polling at predetermined intervals.

Further, the port state transiting function section 111 has a function of transiting the port 2 of the own bridge 1 to any of a blocking state, a listening state, and a learning state according to a line failure sensing result by the line failure sensing function section 112, a reception result of a line failure notification by the failure occurrence notification transmitting/receiving function section 114 described later, and a reception result of a blocking advertisement by the blocking advertisement transmitting/receiving function section 115.

The packet transmitting/receiving function section 113 has a function of performing transmission/reception of packets such as failure occurrence notification, blocking advertisement, blocking release advertisement, and BPDU or the like with the other bridges 1 connected to the ports 2 of the own bridge 1.

The failure occurrence notification transmitting/receiving function section 114 has a function of performing a line failure notification by a unicast packet or broadcast packet (multicast packet) through a packet transmitting/receiving function section 113 when a line failure is sensed by the line failure sensing function section 112 and a function of receiving a line failure notification transmitted from the other bridges 1 through the packet transmitting/receiving function section 113.

This failure occurrence notification transmitting/receiving function section 114 has a function of performing a line failure notification for another bridge 1 which has a blocking port based on an address stored by the address storage function section 117 described later when a unicast packet is used.

The failure occurrence notification transmitting/receiving function section 114 has a function of performing a line failure notification to all the other bridges 1 over the network 3 which become targets of the line failure notification when a broadcast packet (multicast packet) is used.

The blocking advertisement transmitting/receiving function section 115 has a function of transmitting a blocking advertisement packet containing an address of the own bridge 1 to the other bridges 1 over the network 3 by a broadcast packet through a packet transmitting/receiving function 113 in order to notify the other bridges 1 over the network 3 that the port 2 of the own bridge 1 is in a blocking state when the port 2 of the own bridge 1 has a blocking port and a function of receiving a blocking advertisement packet transmitted from the other bridges 1 through the packet transmitting/receiving function section 113.

Here, a blocking advertisement packet has, for example, a format configuration as shown in FIG. 2.

In FIG. 2, a header portion includes address information "a" (broadcast packet "FF-FF-FF-FF-FF-FF" in the example in FIG. 2) indicating a unicast packet or broadcast packet (multicast packet).

Further, a data portion includes information "b" (Flag=blocking) indicating that the port 2 of the own bridge 1 is a blocking port and address information "c" (00-00-91-00-10-20) of the own bridge 1.

The address storage function section 117 has a function of storing an address of another bridge 1 which has transmitted a blocking advertisement packet in a memory of the own bridge 1 for a line failure notification during line failure when a blocking advertisement packet is received at the port 2 of the own bridge 1 from the other bridges 1 through the packet transmitting/receiving function section 113 and the blocking advertisement transmitting/receiving function section 115.

This address storage function section 117 is required when a line failure notification is performed by a unicast packet for another bridge 1 having a blocking port, but can be omitted when a line failure notification is performed by a broadcast packet (multicast packet) for the other bridges 1 over the network.

Further, the blocking release transmitting/receiving function section 116 has a function of, when the blocking port 2 of the own bridge 1 is transited to a forwarding state, transmitting a blocking release advertisement packet for notifying to the other bridges 1 over the network 3 through the packet transmitting/receiving function section 113 and a function of receiving the blocking release advertisement packet from the other bridges 1 through the packet transmitting/receiving function section 113.

Here, the blocking release advertisement packet has, for example, a format configuration as shown in FIG. 3.

In FIG. 3, a header portion includes address information "d" (FF-FF-FF-FF-FF-FF) indicating a broadcast packet (multicast packet).

Further, a data portion includes information "e" (Flag=Non-blocking) indicating that the port 2 of the own bridge 1 is not a blocking port and address information "f" of the own bridge 1 (00-00-91-00-10-20).

The forwarding database erasing function section 118 has a function of erasing a forwarding database of the own bridge 1, when a blocking release advertisement packet is received at the port 2 from another bridge 1 through the packet transmitting/receiving function section 113 and the blocking release advertisement transmitting/receiving function section 114.

Furthermore, the forwarding database is information which learns and accumulates which address which port 2 of the own bridge 1 is connected to by a packet transmitted from the other bridges 1, and is sequentially updated each time when a packet is transmitted from the other bridges 1.

Next, processing contents of the bridge 1 having the above configuration will be described with reference to FIGS. 4 to 8.

Furthermore, the items (1) to (8) in FIGS. 4 to 8 correspond to the items (1) to (8) of operation description described later.

Figure 4:
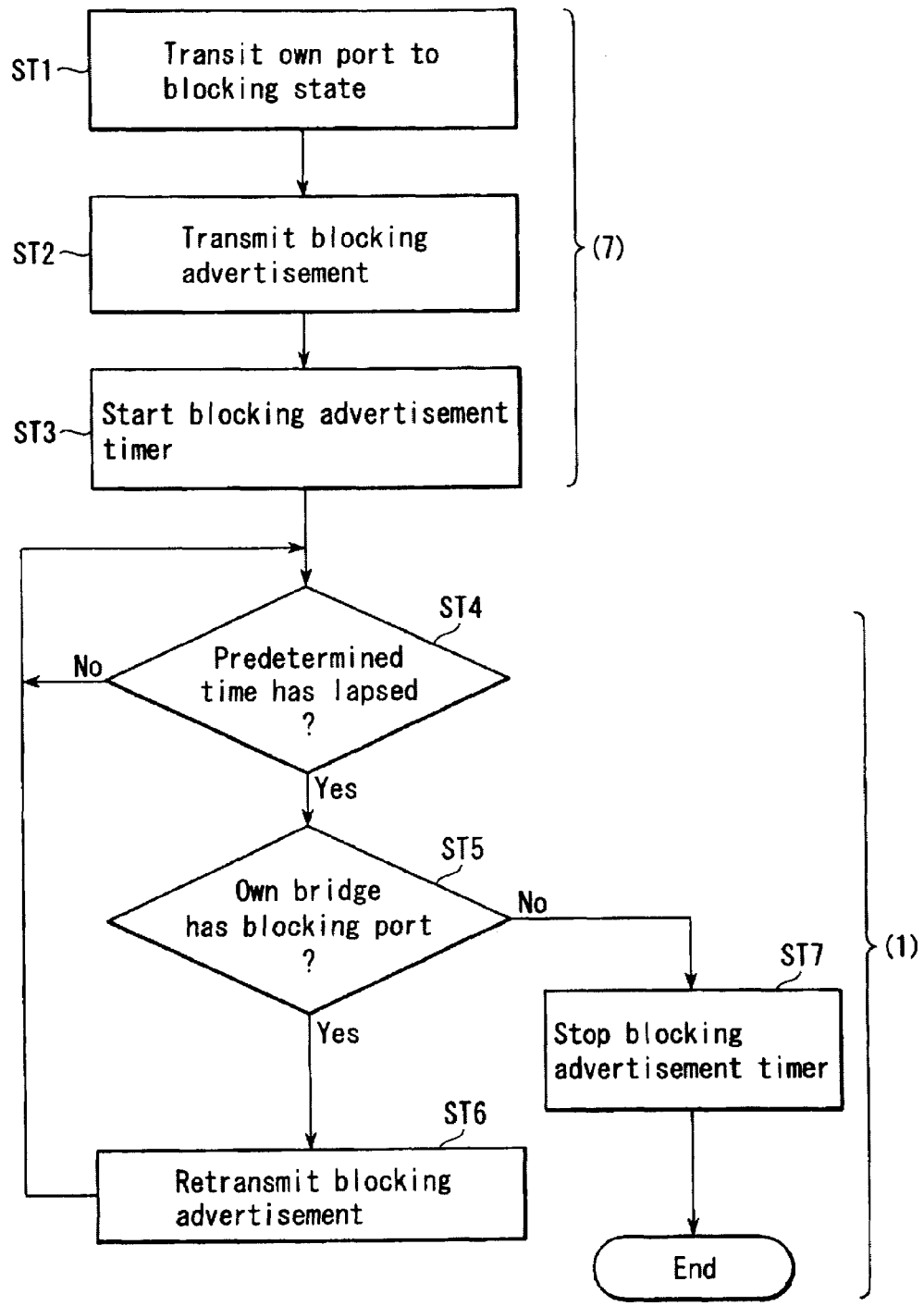
FIG. 4 is a flow chart for explaining a procedure for transmitting a blocking advertisement in the bridge in FIG. 1.

At first, a processing of transmitting a blocking advertisement will be described with reference to FIG. 4.

When a loop is sensed by a spanning tree protocol, any of the ports 2 of the own bridge 1 is transited to a blocking state and entered into a blocking port by the port state transiting function section 111 (step ST1).

In this processing of transmitting a blocking advertisement, a blocking advertisement packet containing the address of the own bridge 1 is transmitted from the port 2 through the blocking advertisement transmitting/receiving function section 115 and the packet transmitting/receiving function section 113 by a broadcast packet (multicast packet) in order to notify all the other bridges 1 over the network 3 that the port 2 of the own bridge 1 has been transited to a blocking state (step ST2).

When this blocking advertisement packet is transmitted, an internal blocking advertisement timer starts counting of the time (step ST3).

Then, it is judged whether or not the blocking advertisement timer has timed a predetermined time set in advance (step ST4).

When it is judged that the blocking advertisement timer has timed a predetermined time (step ST4-Yes), it is judged whether or not the own bridge 1 has a blocking port (step ST5).

When it is judged that the own bridge 1 has a blocking port (step ST5-Yes), a blocking advertisement packet is retransmitted (step ST6) and the processing returns to the judgment processing as to whether or not the blocking advertisement timer has timed a predetermined time (step ST4).

When it is judged that the own bridge 1 does not have a blocking port (step ST5-No), the blocking advertisement timer is stopped (step ST7) and the processing is terminated.

Figure 5:
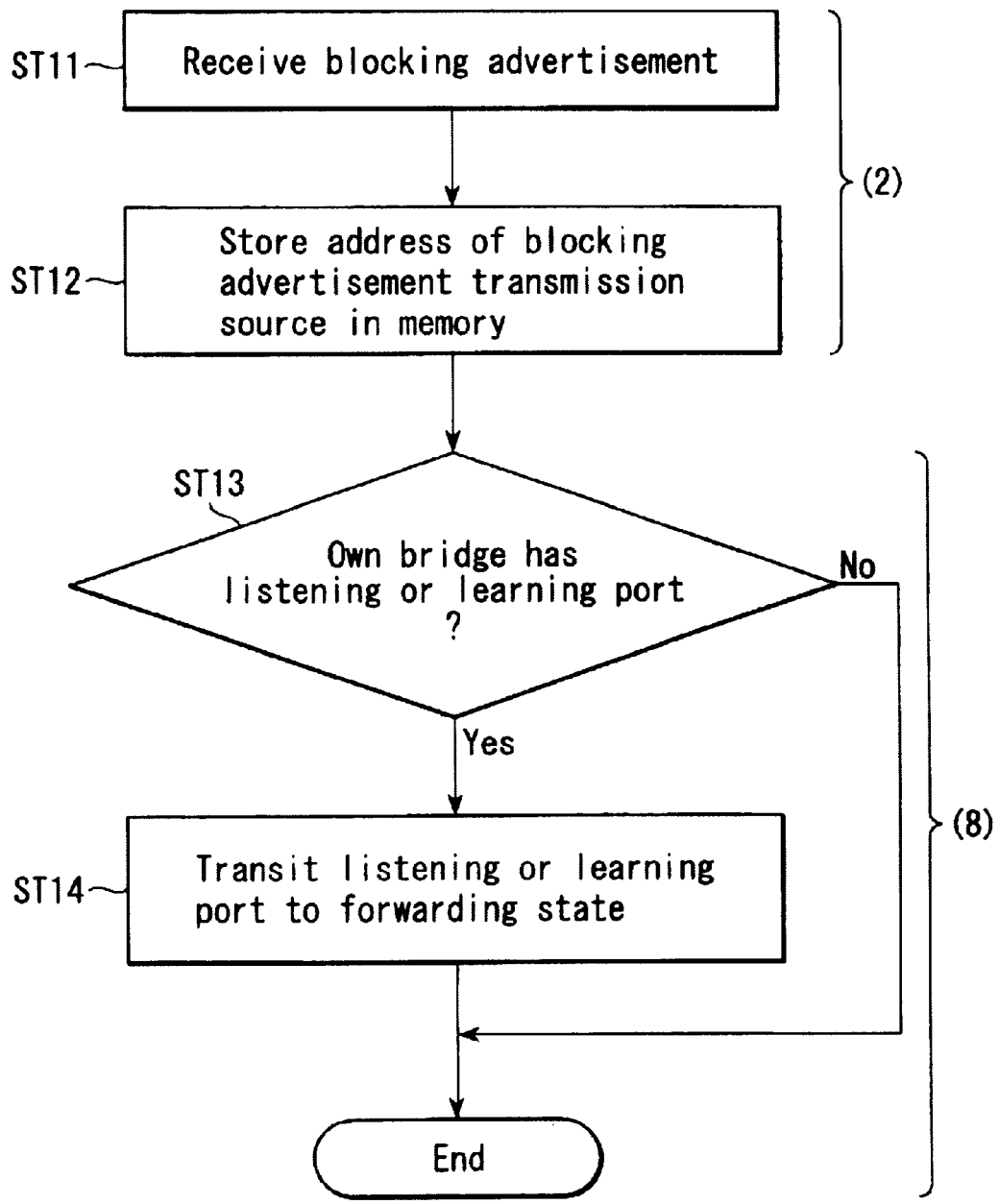
FIG. 5 is a flow chart for explaining a procedure for receiving a blocking advertisement in the bridge in FIG. 1.

Next, a processing of receiving a blocking advertisement will be described with reference to FIG. 5.

In this processing of receiving a blocking advertisement, when a blocking advertisement packet from the other bridges 1 is received by the blocking advertisement transmitting/receiving function section 115 from the port 2 through the packet transmitting/receiving function section 113 (step ST11), an address of the transmission source having a blocking port is stored in a memory of the own bridge 1 based on information of the blocking advertisement packet (step ST12).

Thereafter, it is judged whether or not the own bridge 1 has a listening port or learning port (step ST13).

When it is judged that the own bridge 1 has a listening port or learning port (step ST13-Yes), the listening port or learning port is transited to a forwarding state (step ST14) and the processing is terminated.

When it is judged that the own bridge 1 does not have a listening port or learning port (step ST13-No), the processing is terminated.

Note that in this processing of receiving a blocking advertisement, when a line failure notification is performed by a broadcast packet (multicast packet), the processing of storing an address of the blocking advertisement transmission source in the memory of the own bridge 1 can be omitted.

Figure 6:
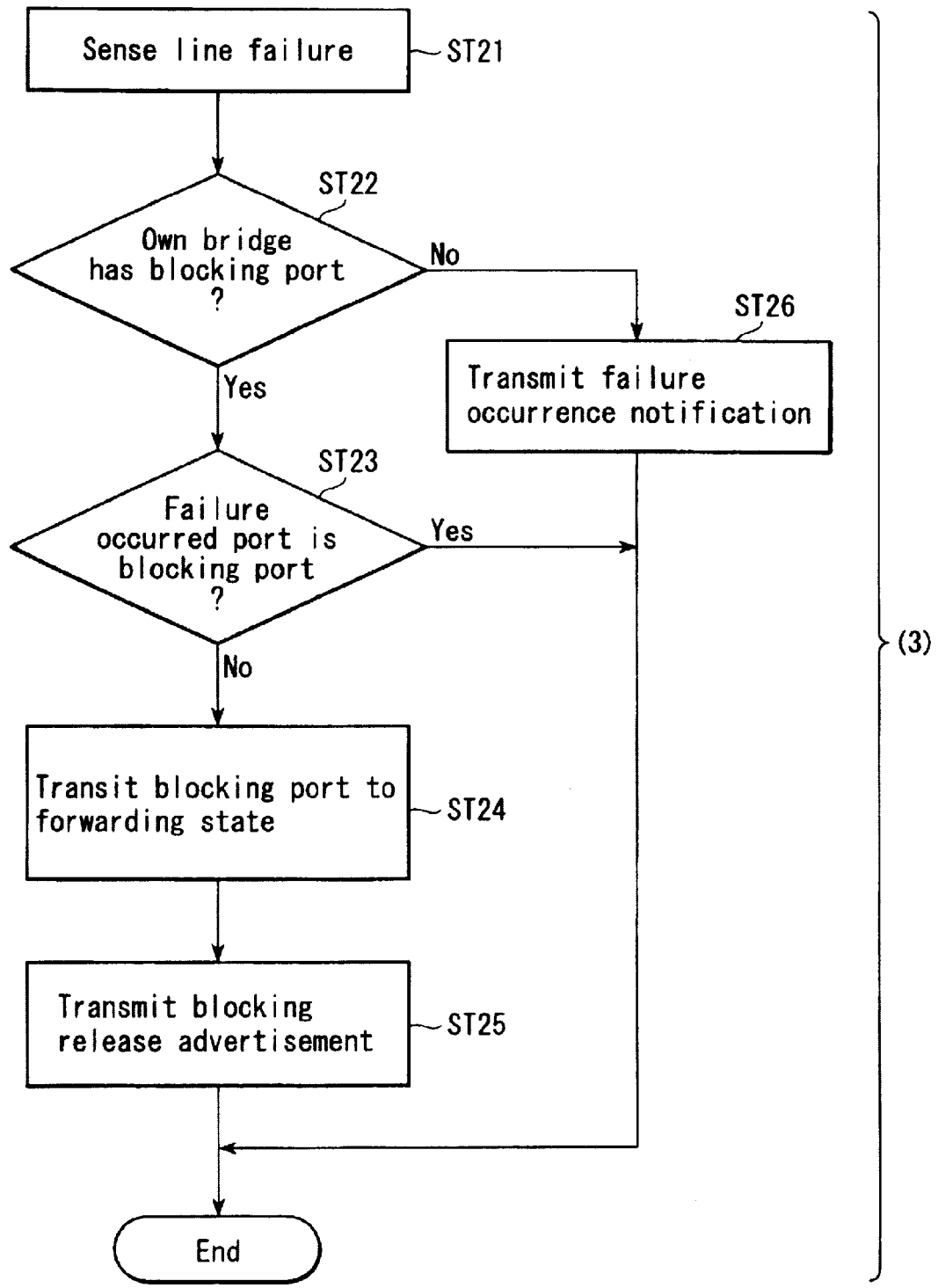
FIG. 6 is a flow chart for explaining a processing procedure when a line failure of the bridge in FIG. 1 is sensed.

Next, a processing when a line failure is sensed will be described with reference to FIG. 6.

In this processing when a line failure is sensed, when a line failure is sensed by the line failure sensing function section 112 (step ST21), it is judged whether or not the own bridge 1 has a blocking port (step ST22).

When it is judged that the own bridge 1 has a blocking port (step ST22-Yes), it is judged whether or not the failure occurred port is a blocking port (step ST23).

When it is judged that the failure occurred port is not a blocking port (step ST23-No), the blocking port is transited to a forwarding state by the port state transiting function section 111 (step ST24).

Thereafter, a blocking release advertisement packet is transmitted from the port 2 through the blocking release transmitting/receiving function section 116 and the packet transmitting/receiving function section 113 (step ST25) and the processing is terminated.

Further, when it is judged that the own bridge 1 does not have a blocking port (step ST22-No), a failure occurrence notification is transmitted from the port 2 through the failure occurrence notification transmitting/receiving function section 114 and the packet transmitting/receiving function section 113 (step ST26) and the processing is terminated.

Further, when it is judged that the failure occurred port is a blocking port (step ST23-Yes), the processing is terminated.

Figure 7:
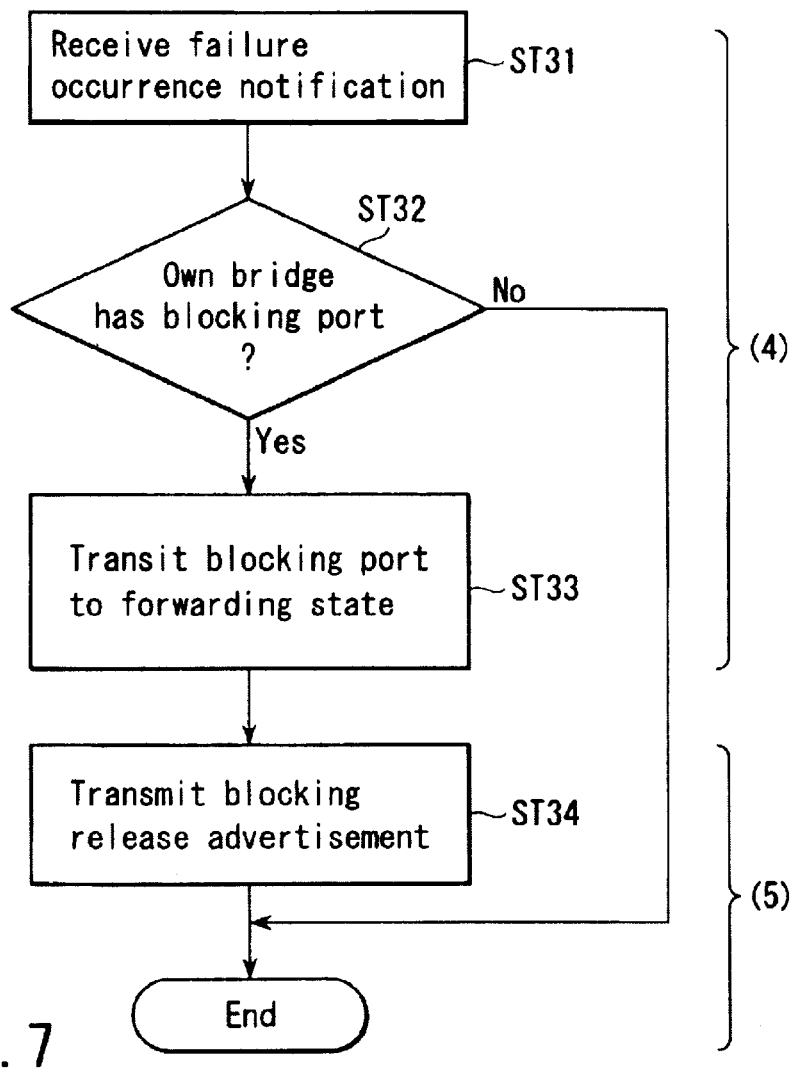
FIG. 7 is a flow chart for explaining a procedure for receiving a line failure notification of the bridge in FIG. 1.

Next, a processing of receiving a failure occurrence notification will be described with reference to FIG. 7.

In this processing of receiving a failure occurrence notification, when a failure occurrence notification from the other bridges 1 is received at the failure occurrence notification transmitting/receiving function section 114 from the port 2 through the packet transmitting/receiving function section 113 (step ST31), it is judged whether or not the own bridge 1 has a blocking port (step ST32).

When it is judged that the own bridge 1 has a blocking port (step ST32-Yes), the blocking port is transited to a forwarding state by the port state transiting function section 111 (step ST33).

Thereafter, a blocking release advertisement packet is transmitted from the port 2 through the blocking release transmitting/receiving function section 116 and the packet transmitting/receiving function section 113 (step ST34) and the processing is terminated.

Further, when it is judged that the own bridge 1 does not have a blocking port (step ST32-No), the processing is terminated.

Figure 8:
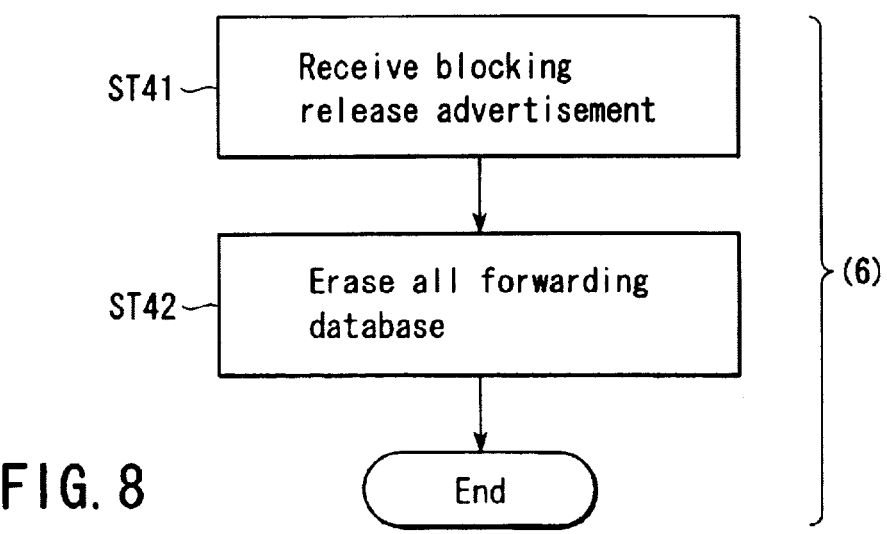
FIG. 8 is a flow chart for explaining a procedure for receiving a release advertisement of the bridge in FIG. 1.

Next, a processing of receiving a blocking release advertisement will be described with reference to FIG. 8.

In this processing of receiving a blocking release advertisement, when a blocking release advertisement packet from the other bridges 1 is received from the port 2 through the packet transmitting/receiving function section 113 and the blocking release transmitting/receiving function section 116 (step ST41), all contents in the forwarding database of the own bridge 1 has are erased (step ST42).

Next, there will be described an operation when a plurality of bridges 1 having each aforementioned processing function are connected to each other in a ring shape, thereby configuring the network 3 containing a redundant route with reference to FIGS. 9 to 11.

(1) The bridge 1 which has a blocking port at the port 2 of the own bridge 1 transmits a blocking advertisement packet containing an address of the own bridge 1 to the network 3 by a broadcast packet (multicast packet) in order to receive a line failure notification when a line failure occurs as described above.

In the example in FIG. 9, the port 2 (2g) of a bridge G at a bridge F side is a blocking port.

Thus, the bridge G transmits a blocking advertisement packet containing an address of its own bridge as shown in FIG. 2 to the network 3 by a broadcast packet (multicast packet) in order to notify other bridges A to F and H to L that the port 2 of the own bridge is a blocking port.

Note that FIG. 9 shows how a blocking advertisement packet is directly transmitted from the bridge G to each bridge A to F, H to L with dotted line. Actually, a blocking advertisement packet from the bridge G is sequentially transmitted to the individual bridges A to F and H to L through intermediate bridges 1.

(2) All the bridges 1 over the network 3 which have received a blocking advertisement packet store an address of the bridge 1 serving as a transmission source which has transmitted a blocking advertisement packet in a memory of each bridge 1 for a line failure notification when a line failure occurs.

Note that when a line failure notification is performed by a broadcast packet (multicast packet), this procedure can be omitted.

(3) The bridge 1 which has sensed a line failure performs any of the following processings according to whether or not the port 2 of the own bridge 1 has a blocking port.

At first, when the bridge 1 does not have a blocking port at the port 2 of the own bridge 1, the bridge 1 which has sensed a line failure transmits a line failure notification for transiting the blocking port to a forwarding state by a unicast packet (or broadcast packet or multicast packet) to the bridge 1 having a blocking port.

Furthermore, when a line failure notification is transmitted by a unicast packet, the line failure notification is transmitted to the bridge 1 (bridge address stored in the memory) which has transmitted a blocking advertisement packet.

Figure 10:
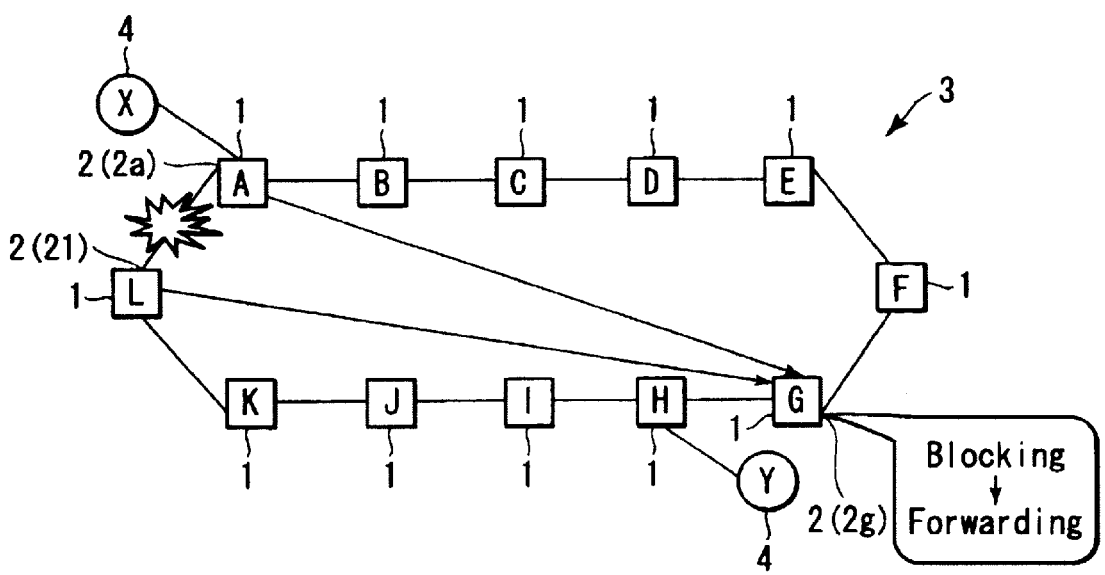
FIG. 10 is a diagram for explaining an operation succeeding from FIG. 9.

In the example shown in FIG. 10, a line failure occurs between the ports 2 (2*a*) and 2 (2*l*) of the bridges A and L, and the bridges A and L sense each line failure.

Then, a line failure notification by a unicast packet is transmitted to the bridge G having a blocking port, from each of the bridges A and L.

Furthermore, the example shown in FIG. 10 shows how a line failure notification packet is directly transmitted from the bridges A and L to the bridge G with solid line. This line failure notification packet is not transmitted to the next bridge after each bridge once captures and processes the packet unlike a conventional BPDU, but the intermediate bridges only forward the packet.

Since a time required for packet forwarding is generally micro order (about 2 microseconds in GE (Gigabit Ether)) seconds, a line failure notification packet can reach all the bridges in 200 micro seconds in total even if the bridges have 100 stages.

Next, the bridge 1 which has sensed a line failure performs nothing when the own bridge 1 has a blocking port at the port 2 thereof and the port 2 where a line failure has occurred is a blocking port.

In this case, since a topology which has logically disconnected only physically disconnects, the communication route does not change.

The bridge at an opposite side to the bridge 1 transmits a line failure notification, but nothing occurs since a blocking port is not present any more.

On the contrary, when a line failure occurs at a port which is not a blocking port, after the bridge immediately enters the blocking port into a forwarding state, it transmits a blocking release advertisement packet to the network 3 by a broadcast packet (multicast packet).

(4) The bridge 1 having a blocking port which has received a failure occurrence notification immediately transits the blocking port to a forwarding state.

In the example shown in FIG. 10, the bridge G having a blocking port receives a line failure notification from the bridge L among line failure notifications from the bridges A and L, and immediately transits the port 2*g* which is a blocking port to a forwarding state.

(5) After the bridge having a blocking port enters the port into a forwarding state, a blocking release advertisement packet is transmitted over the network by a broadcast packet (multicast packet).

Figure 11:
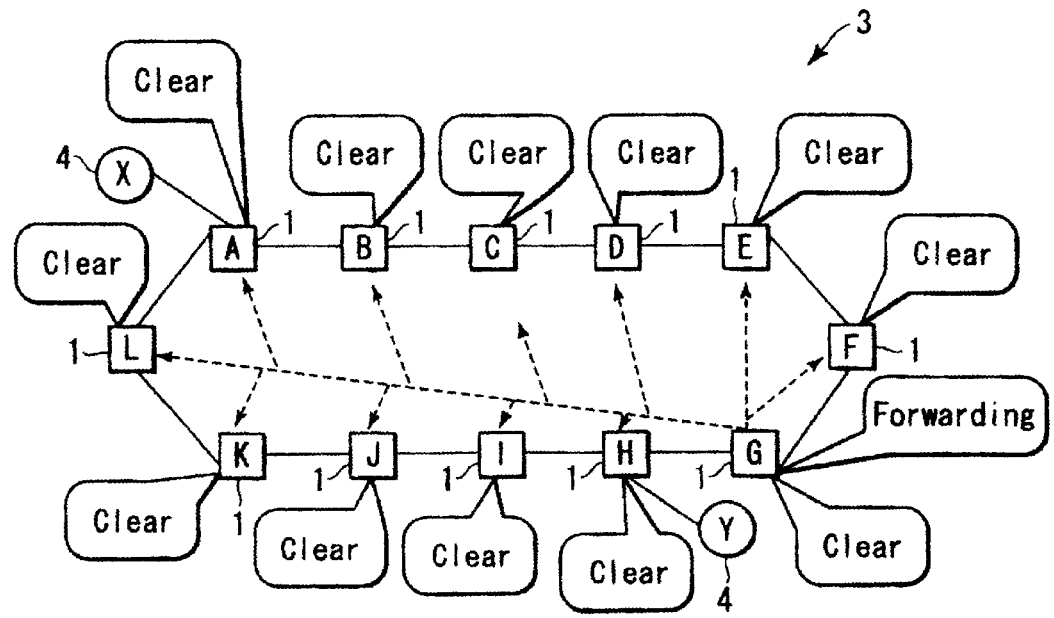
FIG. 11 is a diagram for explaining an operation succeeding from FIG. 10.

In the example shown in FIG. 11, after the bridge G enters the blocking port 2*g* into a forwarding state, a blocking release advertisement packet is transmitted to the bridges A to F and H to L over the network 3 by a broadcast packet (multicast packet).

(6) All the bridges over the network which have received a blocking release advertisement erase their own forwarding database.

In the example shown in FIG. 11, the bridges A to F and H to L receive a blocking release advertisement packet from the bridge G, and the bridges A to F and H to L individually erase (clear) their own forwarding database.

In the meantime, in the above operation, description is made assume that a line failure notification is performed by a unicast packet. But, as shown in FIG. 12, a line failure notification may be transmitted by a broadcast packet (multicast packet).

Figure 12:
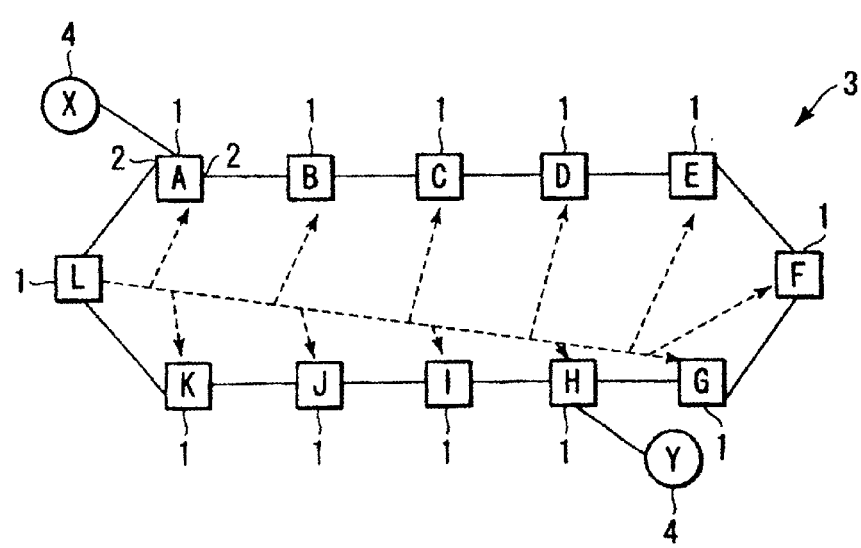
FIG. 12 is a diagram for explaining a case where a line failure notification is performed by a broadcast packet (multicast packet) when a line failure occurs between bridges in a network using the bridge in FIG. 1.

In the example shown in FIG. 12, a line failure occurs between the bridges A and L, and the bridges A and L sense the line failure.

Then, a line failure notification is transmitted from the bridge A to all the bridges B to L over the network 3 by a broadcast packet (multicast packet).

At the same time, a line failure notification is also transmitted from the bridge L to all the bridges A to K over the network 3 by a broadcast packet (multicast packet).

FIG. 12 shows only a line failure notification from the bridge L which the bridge G having a blocking port finally receives as an effective packet when a line failure occurs with broken line.

Also in this case, FIG. 12 shows how a line failure notification packet is directly transmitted from the bridge L to the bridge G. But this line failure notification packet is not transmitted to the next bridge after each bridge once captures and processes the packet unlike a conventional BPDU. The intermediate bridges only forward the packet.

Next, an operation when a new loop is generated over the network 3 will be described with reference to FIGS. 13 and 14.

Figure 13:
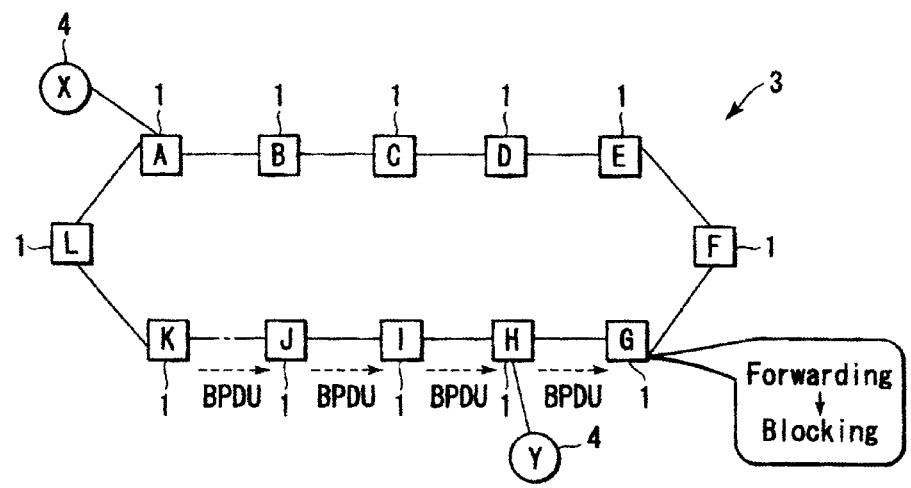
FIG. 13 is a diagram for explaining an operation when a new loop is generated in a network using the bridge in FIG. 1.
Figure 14:
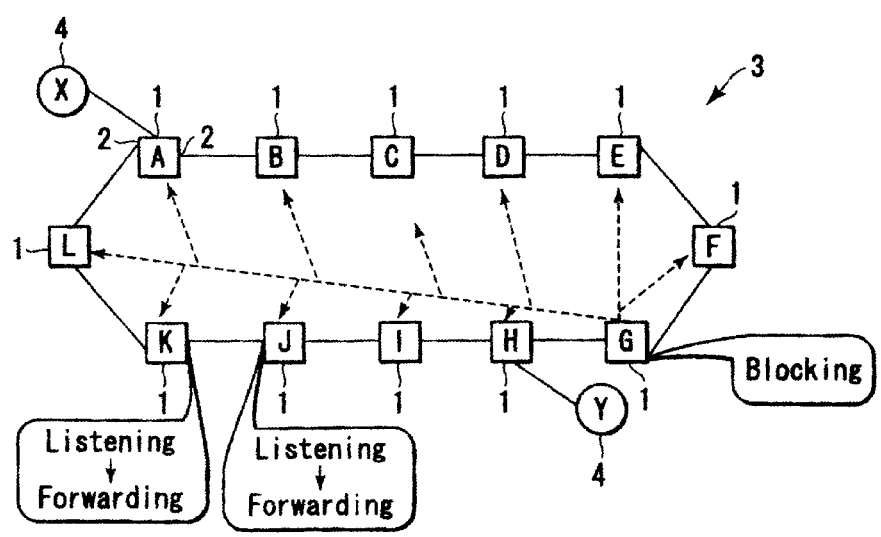
FIG. 14 is a diagram for explaining an operation succeeding from FIG. 12.
Figure 15:
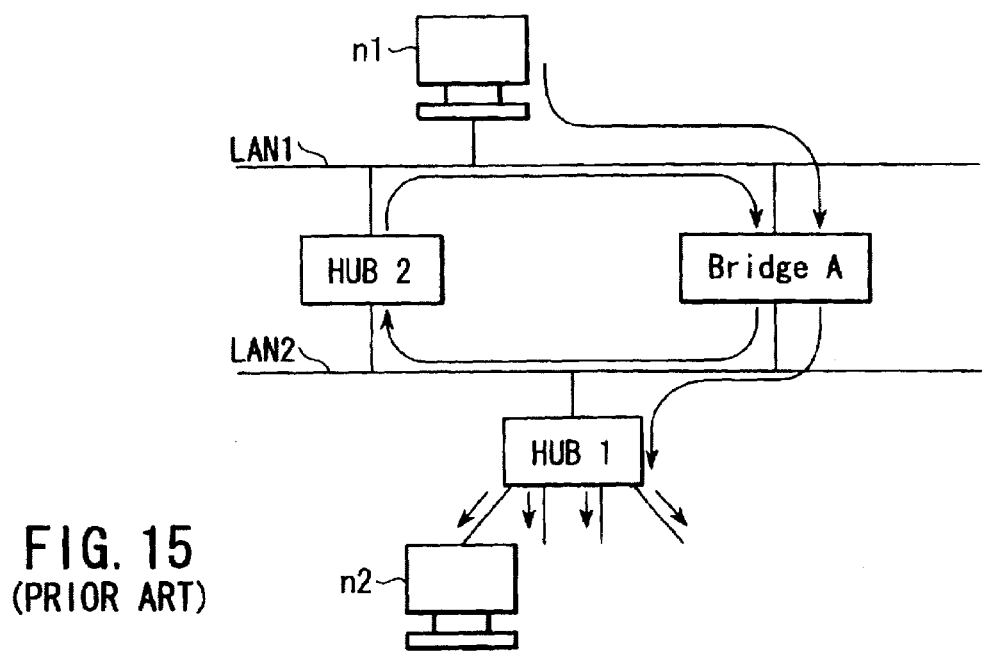
FIG. 15 is a diagram for explaining an object of a conventional spanning tree.
Figure 16:
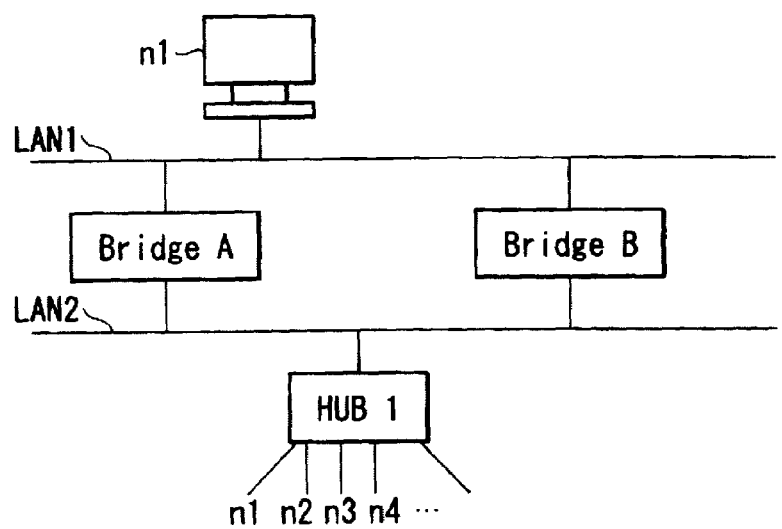
FIG. 16 is a diagram for explaining an object of the conventional spanning tree.
Figure 17:
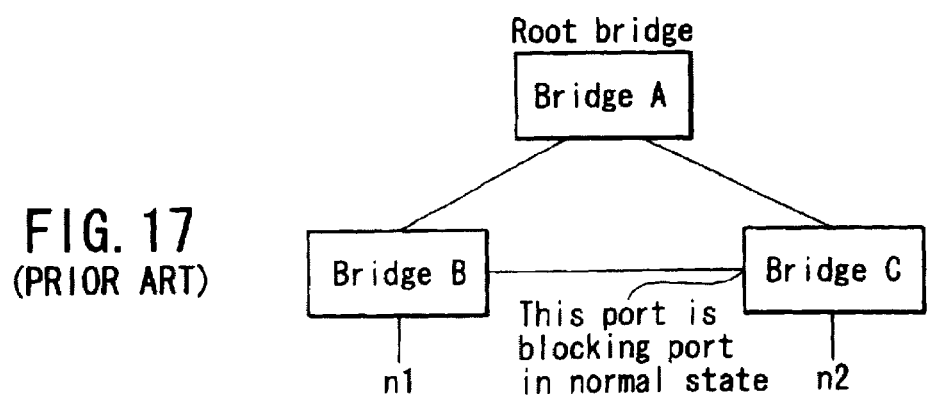
FIG. 17 is a diagram for explaining an operation when a topology change occurs in a network using a bridge for the conventional spanning tree.
Figure 18:
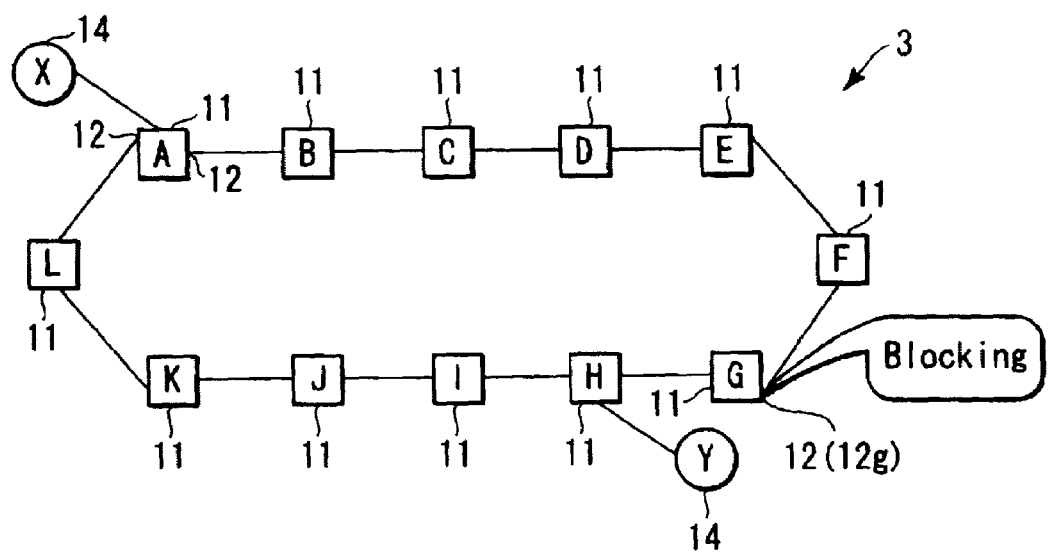
FIG. 18 is a diagram for explaining a processing procedure when a line failure occurs between bridges in a network using a bridge disclosed in U.S. Pat. Appln. Publication No. US2001/0021177A1.
Figure 19:
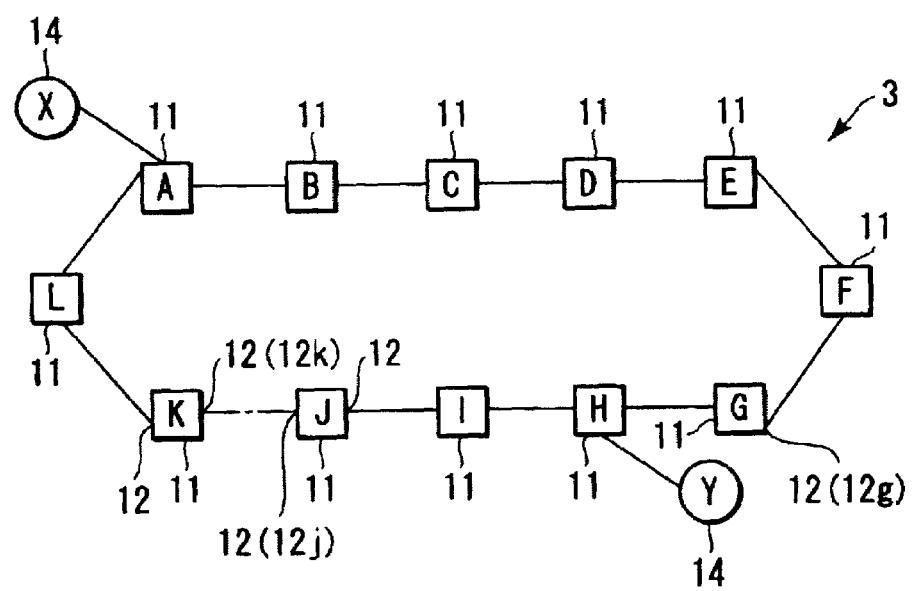
FIG. 19 is a diagrams for explaining a processing procedure when a new loop is configured in a network using a bridge disclosed in U.S. Pat. Appln. Publication No. US2001/0021177A1.

In the examples shown in FIGS. 13 and 14, assume that the bridge A is defined as a root bridge and the bridges J and K are connected to each other, thereby configuring a new loop over the network 3.

In this case, the ports between the bridges J and K enter a listening state by a spanning tree protocol.

Then, there will be described an example where a port of bridge G having a port whose cost is highest, which is connected from bridge A which is a root bridge to the bridge F, is transited to a blocking port by a spanning tree protocol.

(7) When a loop is generated over the network 3, the bridge 1 which receives a BPDU from another direction by a spanning tree protocol and tries to enter the port 2 of the own bridge 1 into a blocking port immediately transmits a blocking advertisement packet containing an address of the own bridge 1 over the network 3 by a broadcast packet (multicast packet).

In the example shown in FIG. 13, when the bridges J and K are connected to each other, the ports 2 therebetween enter a listening state by a spanning tree protocol and a BPDU starts being transmitted from the bridge K towards the bridge J.

Then, when the bridge G which tries to enter the port connected to the bridge F into a blocking port receives a BPDU transmitted from the bridge K which is in a different direction from the bridge A which is a root bridge through the bridges J→I→H, the bridge G transits the ports 2 at the bridge F side from a forwarding state into a blocking state.

As shown in FIG. 14, the bridge G immediately transmits a blocking advertisement packet containing its own address over the network 3 by a broadcast packet (multicast packet).

(8) The bridge which has received a blocking advertisement packet and has a port in a listening or learning state at the own port immediately transits the port into a forwarding state.

In the examples shown in FIGS. 13 and 14, when the bridges J and K receive a blocking advertisement packet from the bridge G, these bridges transit their own ports 2 into a forwarding state.

In this manner, according to the bridge and the route change method of the present embodiment, a packet is not once captured to be processed, and is not transmitted to the next bridge unlike conventionally. The packet is only forwarded to be transmitted to the next bridge without special processing. Thus, wasting time caused by overhead required according to a processing capability of each bridge can be reduced so that a route change can be immediately performed to enable communication.

Further, when a network is connected thereby configuring a new loop, a blocking advertisement containing its own address is immediately transmitted by a broadcast packet from a bridge which tries to enter the own port into a blocking port.

Then, when a bridge which has received this blocking advertisement has a listening or learning port, the bridge immediately enters the port into a forwarding state. Therefore, a port change can be performed without interruption of a packet delivery by a forwarding timer like conventionally, and the packet delivery can be rapidly performed.

Moreover, when a network is connected thereby configuring a new loop, a blocking advertisement containing its own bridge address is immediately transmitted by a broadcast packet from a bridge which tries to enter the own port into a blocking port.

When a bridge which has received this blocking advertisement has a listening or learning port, the bridge immediately enters the port into a forwarding state. Therefore, a port change can be performed without interruption of a packet delivery by a forwarding timer like conventionally, and the packet delivery can be rapidly performed.

As is clear from the above description, according to the present invention, a packet is not once captured to be processed, and is not transmitted to the next bridge when a communication route is started up and a communication route is changed unlike conventionally, and the packet is only transmitted to the next bridge by only forwarding without special processing. Accordingly, it is possible to provide a bridge and a route change method of a network using the same capable of reducing a time caused by overhead according to a processing capability of each bridge, and immediately performing starting up a communication route and a route change.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An own bridge for use in a network having a communication route containing a plurality of bridges, including the own bridge and other bridges connected to each other between respective ports thereof in a ring shape to form a redundant route, the own bridge comprising:
   at least two ports respectively connected to other ports of adjacent bridges by respective external lines so as to permit formation of the communication route resulting from connection of the plurality of bridges to each other between the respective ports in the ring shape;
   a packet transmitting/receiving function section connected to each of the at least two ports;
   a blocking advertisement transmitting/receiving function section connected to the packet transmitting/receiving function section;
   a line failure detecting function section connected to each of the at least two ports;
   a failure occurrence notification transmitting/receiving function section connected to the line failure detecting function section and the packet transmitting/receiving function section;
   a blocking release transmitting/receiving function section connected to the packet transmitting/receiving function section; and
   a forwarding database erasing function section connected to the blocking release transmitting/receiving function section; wherein:
   the blocking advertisement transmitting/receiving function section is arranged to transmit, when one of the at least two ports of the own bridge is in a blocking state to the communication route, a blocking advertisement packet containing information indicating that the own bridge has a blocking port and an address of the own bridge to the network by a broadcast packet or a multicast packet, and to receive the blocking advertisement packet from the other bridges via another one of the at least two ports of the own bridge and the packet transmitting/receiving function section;
   the line failure sensing function section is arranged to sense a failure of a line connected to any of the at least two ports of the own bridge;
   the failure occurrence notification transmitting/receiving function section is arranged to transmit, when the failure of the line connected to any of the least two ports of the own bridge is sensed by the line failure sensing function section and none of the at least two ports of the own bridge is in the blocking state, a line failure notification for setting the blocking port to a forwarding state to the other bridges having the blocking port by any of a unicast packet, the broadcast packet, and the multicast packet via the packet transmitting/receiving function section and one of the at least two ports of the own bridge, and to receive the line failure notification from the other bridges via one of the at least two ports of the own bridge and the packet transmitting/receiving function section;
   the blocking release transmitting/receiving function section is arranged to transmit, when one of the at least two ports of the own bridge has been transited to the forwarding state from the blocking state, a blocking release advertisement packet indicating that the blocking state has been released to the network by the broadcast packet or the multicast packet via the packet transmitting/receiving function section and one of the at least two ports of the own bridge, and to receive the blocking release advertisement packet from the other bridges via one of the at least two ports of the own bridge and the packet transmitting/receiving function section; and
   the forwarding database erasing function section is arranged to erase a forwarding database of the own bridge when the blocking release transmitting/receiving function section receives the blocking release advertisement packet from the other bridges via one of the at least two ports of the own bridge and the packet transmitting/receiving function section;
   whereby when the communication route of the network is started up and changed, a packet is not temporarily captured to be processed and is not transmitted to the next bridge, but the packet is transmitted to the next stage by only forwarding without special processing, so that the time for overheading according to a processing capability of each bridge is reduced and the communication route is immediately started up and changed.

2. A bridge according to claim 1, wherein, when a loop is generated in the network and one of the at least two ports of the own bridge is transited to the blocking state from the forwarding state, the blocking advertisement transmitting/ receiving function section is arranged to transmit the blocking advertisement packet containing information indicating that the own bridge has the blocking port and an address of the own bridge via the packet transmitting/receiving function section and another one of the at least two ports of the own bridge to the network by a broadcast packet or a multicast packet, and to receive the blocking advertisement packet from the other bridges via another one of the at least two ports of the own bridge and the packet transmitting/receiving function section, and the bridge further comprises a port state transiting function section which, when the blocking advertisement packet from the other bridges is received by the blocking advertisement transmitting/receiving function section via one of the at least two ports of the own bridge and the packet transmitting/receiving function section and if any of the at least two ports of the own bridge is in a listening state or is in a learning state, immediately causes the port to transit to the forwarding state.

3. A bridge according to claim 1, further comprising:

an address storage function section arranged to score addresses of the other bridges executing the blocking advertisement, in a memory of the own bridge, when the blocking advertisement packet from the other bridges is received from any of the at least two ports of the own bridge via the packet transmitting/receiving function section and the blocking advertisement transmitting/receiving section;

wherein, when the failure occurrence notification transmitting/receiving function section transmits the line failure notification by the unicast packet via one of the at least two ports of the own bridge and the packet transmitting/receiving function section, the line failure notification is transmitted to the other bridges having the addresses stored in the memory of the own bridge by the address storage function section.

4. An own bridge for use in a network having a communication route containing a plurality of bridges, including the own bridge and other bridges connected to each other between respective ports thereof in a ring shape to form a redundant route, the own bridge comprising:

at least two ports respectively connected to other ports of adjacent bridges by respective external lines so as to permit formation of the communication route resulting from connection of the plurality of bridges to each other between the respective ports in the ring shape;

a packet transmitting/receiving function section connected to each of the at least two ports;

a blocking advertisement transmitting/receiving function section connected to the packet transmitting/receiving function section and which, when a loop is generated in the network and one of the at least two ports of the own bridge is transited to a blocking state from a forwarding state, transmits a blocking advertisement packet containing information indicating that the own bridge has a blocking port and an address of the own bridge via the packet transmitting/receiving function section and another one of the at least two ports of the own bridge to the network by a broadcast packet or a multicast packet, and to receive the blocking advertisement packet from the other bridges via one of the at least two ports of the own bridge and the packet transmitting/receiving function section; and a port state transiting function section which, when the blocking advertisement packet from the other bridges is received by the blocking advertisement transmitting/receiving function section via one of the at least two ports of the own bridge and the packet transmitting/receiving function section, immediately causes the port to transit into the forwarding state when one of the at least two ports of the own bridge is in a listening state or is in a learning state;

whereby when the communication route of the network is started up and changed, a packet is not temporarily captured to be processed and is not transmitted to the next bridge, but the packet is transmitted to the next stage by only forwarding without special processing, so that the time for overheading according to a processing capability of each bridge is reduced and the communication route is immediately started up and changed.

5. A bridge according to claim 4, further comprising:

a failure occurrence notification transmitting/receiving function section which, when a failure of a line connected to one of the at least two ports of the own bridge is sensed and if none of the at least two ports of the own bridge is in the blocking state, transmits a line failure notification for transiting a blocking port into a forwarding state, to the other bridges having the blocking port by any of a unicast packet, a broadcast packet, and a multicast packet via the packet transmitting/receiving function section and another one of the at least two ports of the own bridge, and receives a line failure notification from the other bridges via one of the at least two ports of the own bridge and the packet transmitting/receiving function section; and an address storage function section which is arranged to store addresses of the other bridges executing the blocking advertisement in a memory of the own bridge when the blocking advertisement packet from the other bridges is received from one of the at least two ports of the own bridge via the packet transmitting/receiving function section and the blocking advertisement transmitting/receiving function section, wherein, when the failure occurrence notification transmitting/receiving function section transmits the line failure notification by the unicast packet via one of the at least two ports of the own bridge and the packet transmitting/receiving function section, the line failure notification is transmitted to the other bridges having the addresses stored in the memory of the own bridge by the address storage function section.

6. A communication route change method for a network having a communication route containing a plurality of bridges, including an own bridge and other bridges connected to each other between respective ports thereof in a ring shape to form a redundant route, wherein each of the plurality of bridges comprises:

at least two ports respectively connected to the other ports of adjacent bridges by respective external lines so as to permit formation of the communication route resulting from connection of the plurality of bridges to each other between the respective ports in the ring shape;

a packet transmitting/receiving function section connected to each of the at least two ports;

a blocking advertisement transmitting/receiving function section connected to the packet transmitting/receiving function section;

a line failure detecting function section connected to each of the at least two ports;

a failure occurrence notification transmitting/receiving section connected to the line failure detecting function section and the packet transmitting/receiving function section;

a blocking release transmitting/receiving function section connected to the packet transmitting/receiving function section; and a forwarding database erasing function section connected to the blocking release transmitting/receiving function section, the method comprising:

when one of the at least two ports of the own bridge is in a blocking state to the communication route, transmitting, by means of the blocking advertisement transmitting/receiving function section and via the packet transmitting/receiving function section and another one of the at least two ports of the own bridge, a blocking advertisement packet containing information indicating that the own bridge has a blocking port and an address of the own bridge to the network by a broadcast packet or a multicast packet and receiving the blocking advertisement packet from the other bridges via one of the at least two ports of the own bridge and the packet transmitting/receiving function section;

when a failure of a line connected to any of the at least two ports of the own bridge is sensed by the line failure sensing function section and if none of the at least two ports of the own bridge is in the blocking state, transmitting a line failure notification for transiting the blocking port to a forwarding state to the other bridges having the blocking port by any of a unicast packet, the broadcast packet, and the multicast packet via the packet transmitting/receiving function section and another one of the at least two ports of the own bridge, and receiving the line failure notification from the other bridges by means of the failure occurrence notification transmitting/receiving function section via one of the at least two ports of the own bridge and the packet transmitting/receiving section;

when one of the at least two ports of the own bridge is transited to the forwarding state from the blocking state, transmitting a blocking release advertisement packet which indicates that the blocking port has been set to the forwarding state and the blocking state has been released, to the network by the broadcast packet or the multicast packet via the packet transmitting/receiving function section and another one of the at least two ports of the own bridge, and receiving the blocking release advertisement packet from the other bridges by means of the blocking release transmitting/receiving function section via one of the at least two ports of the own bridge and the packet transmitting/receiving function section; and when the blocking release advertisement packet from the other bridges has been received by the blocking release transmitting/receiving function section via one of the at least two ports of the own bridge and the packet transmitting/receiving function section, erasing a forwarding database of the own bridge by the forwarding database erasing function section;

whereby when the communication route of the network is started up and changed, a packet is not temporarily captured to be processed and is not transmitted to the next bridge, but the packet is transmitted to the next stage by only forwarding without special processing, so that the time for overheading according to a processing capability of each bridge is reduced and the communication route is immediately started up and changed.

7. A communication route change method for a network according to claim 6, further comprising:

providing a port state transiting function section connected to each of the at least two ports in each of the plurality of bridges;

wherein when a loop is generated in the network and one of the at least two ports of the own bridge is in the blocking state to the communication route, transmitting via the packet transmitting/receiving function section and another one of the at least two ports of the own bridge, the blocking advertisement packet containing information indicating that the own bridge has the blocking port and an address of the own bridge to the network by a broadcast packet or a multicast packet, and receiving the blocking advertisement packet from the other bridges via one of the at least two ports of the own bridge and the packet transmitting/receiving function section; and whereby when the blocking advertisement packet from the other bridges has been received by the blocking advertisement transmitting/receiving function section via one of the at least two ports of the own bridge and the packet transmitting/receiving function section, immediately causing the port to transit to the forwarding state by the port state transiting function section if one of the at least two ports of the own bridge is in a listening state or is in a learning state.

8. A communication route change method for a network according to claim 6, further comprising:

when the blocking advertisement packet from the other bridges is received from one of the at least two ports of the own bridge via the packet transmitting/receiving function section and the blocking advertisement transmitting/receiving function section, providing, in each of the plurality of bridges, an address storage function section which has a function of storing addresses of the other bridges executing the blocking advertisement in a memory of the own bridge; and when the line failure notification is transmitted by the unicast packet by the failure occurrence notification transmitting/receiving function section via one of the at least two ports of the own bridge and the packet transmitting/receiving function section, transmitting the line failure notification to the other bridges having the addresses stored in the memory of the own bridge by the address storage function section.

9. A communication route change method for a network having a communication route containing a plurality of bridges, including an own bridge and other bridges connected to each other between respective ports thereof in a ring shape to form a redundant route, wherein each of the plurality of bridges comprises:

at least two ports respectively connected to other ports of adjacent bridges by respective external lines so as to permit formation of the communication route resulting from connection of the plurality of bridges to each other between the respective ports in the ring shape;

a packet transmitting/receiving function section connected to each of the at least two ports;

a blocking advertisement transmitting/receiving function section connected to the pocket transmitting/receiving function section; and a port state transiting function section connected to each of the at least two ports;

the method comprising:

when a loop is generated in the network and one of the at least two ports of the own bridge is in a blocking state to the communication route, transmitting by means of the blocking advertisement transmitting/receiving function section and via the packet transmitting/receiving function section and another one of the at least two ports of the own bridge, a blocking advertisement packet containing information indicating that the own bridge has a blocking port and an address of the own bridge which indicates that the port of the own bridge has been set to the blocking state, to the network by a broadcast packet or a multicast packet and receiving the blocking advertisement packet from the other bridges via one of the at least two ports of the own bridge and the packet transmitting/receiving function section; and when the blocking advertisement packet from the other bridges has been received by the blocking advertisement transmitting/receiving function section, if one of the at least two ports of the own bridge is in a listening state or is in a learning state, immediately causing the port to transit to the forwarding state by the port state transiting function section;

whereby when the communication route of the network is started up and changed, a packet is not temporarily captured to be processed and is not transmitted to the next bridge, but the packet is transmitted to the next stage by only forwarding without special processing, so that the time for overheading according to a processing capability of each bridge is reduced and the communication route is immediately started up and changed.

10. A communication route change method for a network according to claim 9, further comprising:

preparing in each of the plurality of bridges a line failure detecting function section connected to each of the at least two ports and a failure occurrence notification transmitting/receiving function section connected to the line failure detecting function section and the packet transmitting/receiving function section;

when the blocking advertisement packet from the other bridges is received from one of the at least two ports of the own bridge via the packet transmitting/receiving function section and the blocking advertisement transmitting/receiving function section, preparing in each of the plurality of bridges an address storage function section which has a function of storing addresses of the other bridges executing the blocking advertisement in a memory of the own bridge;

when a failure of a line connected to one of the at least two ports of the own bridge is sensed by the line failure sensing function section, if none of the at least two ports of the own bridge is in the blocking state, transmitting a line failure notification for transiting the blocking port to the forwarding state to the other bridges having the blocking port by any of the unicast packet, the broadcast packet, and the multicast packet via the packet transmitting/receiving function section and one of the at least two ports of the own bridge, and receiving a line failure notification from the other bridges by means of the failure occurrence notification transmitting/receiving function section via one of the at least two ports of the own bridge and the packet transmitting/receiving function section; and when the line failure notification is transmitted by the unicast packet, the line failure notification is transmitted to the other bridges having the addresses stored in the memory of the own bridge by the address storage function section.

11. An own bridge for use in a network having a communication route containing a plurality of bridges, including the own bridge and other bridges connected to each other between respective ports thereof in a ring shape to form a redundant route, the own bridge comprising:

at least two ports respectively connected to other ports of adjacent bridges by respective external lines so as to permit formation of the communication route resulting from connection of the plurality of bridges to each other between the respective ports in the ring shape;

a packet transmitting/receiving function section connected to each of the at least two ports;

a blocking advertisement transmitting/receiving function section connected to the packet transmitting/receiving function section;

a port state transiting function section connected to each of the at least two ports;

a line failure detecting function section connected to each of the at least two ports; and a failure occurrence notification transmitting/receiving function section connected to the line failure detecting function section and the packet transmitting/receiving function section;

wherein:

the blocking advertisement transmitting/receiving function section is arranged to transmit, when a loop is generated in the network and one of the at least two ports of the own bridge is transited to a blocking state blocking from the communication route, a blocking advertisement packet containing an address of the own bridge which indicates that the own bridge has a blocking port, to the network by a broadcast packet or a multicast packet, via the packet transmitting/receiving function section and another one of the at least two ports of the own bridge, and to receive the blocking advertisement packet from the other bridges via one of the at least two ports of the own bridge and the packet transmitting/receiving function section;

the port state transiting function section, when the blocking advertisement packet from the other bridges is received by the blocking advertisement transmitting/receiving function section and when one of the at least two ports of the own bridge is in a listening state or is in a learning state, is arranged to immediately cause the port to transit to a forwarding state;

the line failure sensing function section is arranged to sense a failure of a line connected to any of the at least two ports of the own bridge;

the failure occurrence notification transmitting/receiving function section is arranged to transmit, when a failure of each of the lines connected to the at least two ports of the own bridge is sensed by the line failure sensing function section and when any of the at least two ports of the own bridge is not in the blocking state, a line failure notification for transiting the blocking port to the forwarding state to the other bridges having the blocking port by any of a unicast packet, the broadcast packet, and the multicast packet via the packet transmitting/receiving function section and one of the at least two ports of the own bridge, and to receive the line failure notification from the other bridges via one of the at least two ports of the own bride and the packet transmitting/receiving function section;

the own bridge further comprises an address storage function section arranged to store addresses of the other bridges executing the blocking advertisement in a memory of the own bridge when the blocking advertisement packet from the other bridges is received from one of the at least two ports of the own bridge via the packet transmitting/receiving function section and the blocking advertisement transmitting/receiving function section; and when the failure occurrence notification transmitting/receiving function section transmits the line failure notification by the unicast packet via one of the at least two ports of the own bridge and the packet transmitting/receiving function section, the line failure notification is transmitted to the other bridges having the addresses stored in the memory of the own bridge by the address storage function section;

whereby when the communication route of the network is started up and changed, a packet is not temporarily captured to be processed and is not transmitted to the next bridge, but the packet is transmitted to the next state by only forwarding without special processing, so that the time for overheading according to a processing capability of each bridge is reduced and the communication route is immediately started up and changed.

12. A bridge according to claim 11, further comprising:

a blocking release transmitting/receiving function section connected to the packet transmitting/receiving function section; and a forwarding database erasing function section connected to the blocking release transmitting/receiving function section;

wherein:

when one of the at least two ports of the own bridge has been transited to the forwarding state from the blocking state, the blocking release transmitting/receiving function section is arranged to transmit a blocking release advertisement packet indicating that the blocking state has been released, to the network by a flag broadcast packet or the multicast packet via the packet transmitting/receiving function section and another one of the at least two ports of the own bridge, and to receive the blocking release advertisement packet from the other bridges via one of the at least two ports of the own bridge and the packet transmitting/receiving function section; and when the blocking release advertisement packet from the other bridges is received by the blocking release transmitting/receiving function section via one of the at least two ports of the own bridge and the packet transmitting/receiving function section, the forwarding database erasing function section is arranged to erase a forwarding database of the own bridge.

13. A bridge according to claim 11, wherein when the own bridge has the blocking port as one of the at least two ports, the blocking advertisement transmitting/receiving function section is arranged to transmit the blocking advertisement packet containing an address of the own bridge which indicates that the own bridge has a blocking port to the network by the broadcast packet or the multicast packet, via the packet transmitting/receiving function section and another one of the at least two ports of the own bridge, and to receive the blocking advertisement packet from the other bridges via one of the at least two ports of the own bridge and the packet transmitting/receiving function section.

14. A communication route change method for a network having a communication route containing a plurality of bridges, including an own bridge and other bridges connected to each other between respective ports thereof in a ring shape to form a redundant route, wherein each of the plurality of bridges comprises:

at least two ports respectively connected to other ports of adjacent bridges by respective external lines so as to permit formation of the communication route resulting from connection of the plurality of bridges to each other between the respective ports in the ring shape;

a line failure detecting function section and a packet transmitting/receiving function section connected to each of the at least two ports;

a failure occurrence notification transmitting/receiving function section connected to the line failure detecting function section and the packet transmitting/receiving function section;

a blocking advertisement transmitting/receiving function section and a blocking release transmitting/receiving function section connected to the packet transmitting/receiving function section;

a forwarding database erasing function section connected to the blocking release transmitting/receiving function section; and an address storage function section which stores addresses of the other bridges to which the blocking advertisement packet is to be transmitted by the blocking advertisement transmitting/receiving function section;

the method comprising:

when one of the at least two ports of the own bridge is in a blocking state to the communication route, transmitting a blocking advertisement packet containing an address of the own bridge which indicates that the own bridge has a blocking port to the network by a broadcast packet or a multicast packet via the packet transmitting/receiving function section and another one of the at least two ports of the own bridge, and receiving the blocking advertisement packet from the other bridges by means of the blocking advertisement transmitting/receiving function section of each of the plurality of bridges via another one of the at least two ports of the own bridge and the packet transmitting/receiving function section;

sensing a failure of each line connected to the at least two ports of the own bridge by the line failure sensing function section of each of the plurality of bridges;

when a failure of each line connected to the at least two ports of the own bridge is sensed by the line failure sensing function section and if any of the at least two ports of the own bridge is not in the blocking state, transmitting a line failure notification for transiting the blocking port to a forwarding state to the other bridges having the blocking port by any of a unicast packet, the broadcast packet, and the multicast packet via the packet transmitting/receiving function section and one of the at least two ports of the own bridge, and receiving the line failure notification from the other bridges by means of the failure occurrence notification transmitting/receiving function section of each of the plurality of bridges via one of the at least two ports of the own bridge and the packet transmitting/receiving function section;

when one of the at least two ports of the own bridge has been transited to the forwarding state from the blocking state, transmitting a blocking release advertisement packet which indicates that the blocking state has been released, to the network by the broadcast packet or the multicast packet via the packet transmitting/receiving function section and another one of the at least two ports of the own bridge, and receiving the blocking release advertisement packet from the other bridges by means of the blocking release transmitting/receiving function section of each of the plurality of bridges via one of the at least two ports of the own bridge and the packet transmitting/receiving function section; and when the blocking release advertisement packet from the other bridges has been received by the blocking release transmitting/receiving function section via one of the at least two ports of the own bridge and the packet transmitting/receiving function section, erasing a forwarding database of the own bridge by the forwarding database erasing function section of each of the plurality of bridges;

whereby when the communication route of the network is started up and changed a packet is not temporarily captured to be processed and is not transmitted to the next bridge, but the packet is transmitted to the next stage by only forwarding without special processing, so that the time for overheading according to a processing capability of each bridge is reduced and the communication route is immediately started up and changed.

15. A method according to claim 14, further comprising:

when a loop is generated in the network and one of the at least two ports of the own bridge has been transited to the blocking state, transmitting the blocking advertisement packet containing an address of the own bridge which indicates that the own bridge has a blocking port to the network via the packet transmitting/receiving function section and another one of the at least two ports of the own bridge, by the broadcast packet or the multicast packet, and receiving the blocking advertisement packet from the other bridges by means of the blocking advertisement transmitting/receiving function section of each of the plurality of bridges via one of the at least two ports of the own bridge and the packet transmitting/receiving function section.

16. A method according to claim 14, further comprising:

preparing a port state transiting function section connected to the at least two ports in each of the plurality of bridges; and when the blocking advertisement packet from the other bridges is received via any of the at least two ports of the own bridge and the packet transmitting/receiving function section and when any of the at least two ports of the own bridge is in a listening state or is in learning state, immediately transiting the port to the forwarding state by the port state transiting function section of each of the plurality of bridges.

* * * * *